US007927001B2

(12) United States Patent
Choi et al.

(10) Patent No.: US 7,927,001 B2
(45) Date of Patent: Apr. 19, 2011

(54) BACKLIGHT ASSEMBLY AND DISPLAY DEVICE HAVING THE SAME

(75) Inventors: Seong-Sik Choi, Seoul (KR); Dong-Lyoul Shin, Suwon-si (KR); Jae-Hwan Chun, Suwon-si (KR); Byung-Yun Joo, Goyang-si (KR); Jung-Wook Paek, Suwon-si (KR); Jin-sung Choi, Yongin-si (KR); Ju-Hwa Ha, Seoul (KR); Heu-Gon Kim, Suwon-si (KR); Sang-Hoon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/289,221

(22) Filed: Nov. 28, 2005

(65) Prior Publication Data

US 2006/0133108 A1 Jun. 22, 2006

(30) Foreign Application Priority Data

Dec. 21, 2004 (KR) ........................ 10-2004-0109918
Jan. 20, 2005 (KR) ........................ 10-2005-0005261
Feb. 5, 2005 (KR) ........................ 10-2005-0010930

(51) Int. Cl.
*F21V 7/04* (2006.01)

(52) U.S. Cl. ........................................ 362/616; 362/621

(58) Field of Classification Search .................. 362/616, 362/621

See application file for complete search history.

(56) References Cited

U.S. PATENT DOCUMENTS

| | | | | |
|---|---|---|---|---|
| 6,469,755 | B1 * | 10/2002 | Adachi et al. | 349/62 |
| 6,950,154 | B2 * | 9/2005 | Lee | 362/632 |
| 7,011,440 | B2 * | 3/2006 | Leu et al. | 362/621 |
| 2004/0109314 | A1 * | 6/2004 | Yang | 362/245 |
| 2005/0046321 | A1 * | 3/2005 | Suga et al. | 313/112 |
| 2006/0002141 | A1 * | 1/2006 | Ouderkirk et al. | 362/609 |

FOREIGN PATENT DOCUMENTS

| | | | |
|---|---|---|---|
| JP | 2003-279978 | A | 10/2003 |
| JP | 2004-127680 | A | 4/2004 |
| JP | 2004-235103 | A | 8/2004 |
| KR | 1020030091570 | A | 12/2003 |

OTHER PUBLICATIONS http://websites.quincy.edu/~matskvi/ddd/glossary.html#c.*

* cited by examiner

*Primary Examiner* — Sandra L O Shea
*Assistant Examiner* — William J Carter
(74) *Attorney, Agent, or Firm* — Cantor Colburn LLP

(57) ABSTRACT

In a backlight assembly and a display device including the backlight assembly, the backlight assembly includes a light dispersion member and a light source having a plurality of light source members, a distance defined between the light sources members adjacent to each other. The light dispersion member includes a lower face portion having alternately arranged ridges and grooves. Each light source is positioned under a respective ridge. An interval between a center of each light source and the respective ridge positioned directly over the light source is from about 0.2 to about 0.55 times the distance.

14 Claims, 24 Drawing Sheets

BACKLIGHT ASSEMBLY AND DISPLAY DEVICE HAVING THE SAME

This application claims priority to Korean Patent Application No. 2004-109918, filed on Dec. 21, 2004, Korean Patent Application No. 2005-5261, filed on Jan. 13, 2005, and Korean Patent Application No. 2005-10930, filed on Feb. 5, 2005 and all the benefits accruing therefrom under 35 USC §119, and the contents of which in their entireties are herein incorporated by reference.

BACKGROUND OF THE INVENTION

1. Field of the Invention

The present invention relates to a backlight assembly and a display device having the backlight assembly. More particularly, the present invention relates to a backlight assembly having a relatively high brightness and a relatively high brightness uniformity and a display device having the backlight assembly.

2. Description of the Related Art

In general, a display device displays a data of an information processing device as an image. A liquid crystal display ("LCD") device is one type of such a display device. The LCD device includes a liquid crystal ("LC") layer, a controlling part, and a light providing part. The controlling part controls the liquid crystal ("LC") layer. The light providing part provides the LC layer with light.

When an electrical field is applied to the LC layer, LC molecules in the LC layer may be rearranged. Thus, light transmissivity of the LC layer may vary. The display device may display the image by using a variation of the light transmissivity.

The controlling part includes a first substrate having a first electrode and a second substrate having a second electrode. The LC layer is positioned between the first substrate and the second substrate. The electrical field is generated between the first electrode and the second electrode.

The light providing part provides the LC layer included in the controlling part with light. The light providing part includes a lamp and an optical member. The optical member may improve brightness and brightness uniformity.

In general, a cold cathode fluorescent lamp ("CCFL") having a bar shape is employed as the lamp. The optical member includes a dispersion plate having a plate shape. The dispersion plate attempts to suppress a bright line generated from the CCFL so that the brightness may be improved.

However, the conventional dispersion plate does not completely or efficiently remove the bright line generated from the CCFL. Thus, the conventional display device has a relatively low display quality.

BRIEF SUMMARY OF THE INVENTION

Exemplary embodiments of the present invention provide a backlight assembly capable of efficiently removing a bright line to improve brightness.

Exemplary embodiments of the present invention also provide a display device including the backlight assembly.

In accordance with exemplary embodiments of the present invention, a backlight assembly includes a light dispersion member and a light source. The light dispersion member includes a lower face portion having ridges and grooves. The ridges and the grooves are alternately arranged on the lower face portion. The light source has a plurality of light source members, a distance defined between light source members that are adjacent to each other. Each light source member is positioned under a respective ridge. An interval between a center of a first light source member and a ridge positioned directly over the first light source member is from about 0.2 to about 0.55 times the distance.

In accordance with other exemplary embodiments of the present invention, a backlight assembly includes a light dispersion member, a light source, and a reflection plate. The light dispersion member includes a lower face portion having ridges and grooves. The ridges and the grooves are alternately arranged on the lower face portion. The light source has a plurality of light source members, a distance defined between light source members adjacent to each other. Each light source member is positioned directly under a respective ridge. The light source generates a light. The reflection plate is positioned under the light source. The reflection plate reflects the light incident thereon toward the lower face portion of the light dispersion member. An interval between a center of a first light source member and the reflection plate is from about 0.10 to about 0.25 times the distance.

In accordance with still other exemplary embodiments of the present invention, a backlight assembly includes a light dispersion member, a light source, and a reflection plate. The light dispersion member includes a lower face portion having ridges and grooves. The ridges and the grooves are alternately arranged on the lower face portion. The light source has a plurality of light source members, a distance defined between light source members that are adjacent to each other. Each light source member is positioned under a respective ridge. The light source generates light. The reflection plate is positioned under the light source. The reflection plate reflects a light incident thereon toward the lower face portion of the light dispersion member. A first interval between a center of a first light source member and a ridge positioned directly over the first light source member is from about 0.2 to about 0.55 times the distance. A second interval between the center of the first light source member and the reflection plate is from about 0.10 to about 0.25 times the distance. In accordance with still other exemplary embodiments of the present invention, a display device includes lamps, a light dispersion member, a reflection plate, and a display panel. The lamps generate light. The lamps are arranged substantially in parallel with each other and a distance is defined between centers of lamps that are adjacent to each other. The light dispersion member includes a lower face portion having ridges and grooves. The ridges and the grooves are alternately arranged on the lower face portion. The light dispersion member is positioned over the lamps. A first interval between each ridge and a center of each respective lamp is from about 0.2 to about 0.55 times the distance. The reflection plate is positioned under the lamps. The reflection plate reflects a light incident thereon toward the lower face portion of the light dispersion member. A second interval between each lamp and the reflection plate is from about 0.10 to about 0.25 times the distance. The display panel is positioned over the light dispersion member. The display panel displays an image by using a light irradiated from the light dispersion member.

In accordance with still other exemplary embodiments of the present invention, a backlight assembly includes light sources, a dispersion plate, and a fixing member. The light sources generate light and extend in a first direction. The dispersion plate disperses the light incident thereon. The dispersion plate has a ridge portion defining a first lower face facing the light sources. The ridge portion has ridges extending substantially in the first direction. The fixing member supports the dispersion plate thereon. The dispersion plate has a second lower face supported on the fixing member. The second lower face has a substantially planar section.

In accordance with still other exemplary embodiments of the present invention, a backlight assembly includes light sources, a dispersion plate, and a fixing member. The light sources generate light and extend in a first direction. The dispersion plate disperses the light incident thereon. The dispersion plate has a ridge portion defining an entire lower face of the dispersion plate. The ridge portion includes ridges extending substantially in the first direction. The fixing member supports the dispersion plate thereon. A central portion of the lower face faces the light sources and an edge portion of the lower face is supported on the fixing member.

In accordance with still other exemplary embodiments of the present invention, a flat panel display device includes a flat display panel and a backlight assembly. The flat display panel displays an image. The backlight assembly includes light sources, a dispersion plate, and a fixing member. The light sources generate light and extend in a first direction. The dispersion plate disperses the light incident thereon. The dispersion plate has a ridge portion defining a first lower face facing the light sources. The ridge portion has ridges extending substantially in the first direction. The fixing member supports the dispersion plate thereon. The dispersion plate has a second lower face supported on the fixing member. The second lower face has a substantially planar section.

In accordance with still other exemplary embodiments of the present invention, a backlight assembly includes a light source and a first optical member. The light source generates a first light having a first brightness and a second light having a second brightness. A level of the second brightness is substantially higher than a level of the first brightness. The first optical member is positioned over the light source. The first optical member has a first portion having a first vertical thickness and a second portion having a second vertical thickness. The second thickness is substantially larger than the first thickness. The first portion is where the first light is incident. The second portion is where the second light is incident.

In accordance with still other exemplary embodiments of the present invention, a display device includes a backlight assembly and a display panel. The backlight assembly includes a light source and a first optical member. The light source generates a first light having a first brightness and a second light having a second brightness. A level of second brightness is substantially higher than a level of the first brightness. The first optical member is positioned over the light source. The first optical member has a first portion having a first vertical thickness and a second portion having a second vertical thickness. The second thickness is substantially larger than the first thickness. The first portion is where the first light is incident. The second portion is where the second light is incident. The display panel is positioned over the backlight assembly. The display panel displays an image by using a light irradiated from the backlight assembly.

In accordance with still other exemplary embodiments of the present invention, a light dispersion member for a backlight assembly includes a first face for irradiating light and a second face for receiving light from a light source, the second face having a plurality of alternately arranged ridges and grooves forming a wave shape, wherein thickest portions of the light dispersion member are between about 1.15 to about 1.75 times thinnest portions of the light dispersion member.

Thus, according to the exemplary embodiments of the present invention, a light dispersion member dispersing a light has an irregular thickness so that brightness and brightness uniformity may be improved. In addition, a display device may display an image having a relatively high display quality.

Furthermore, a backlight assembly need not contain a dual brightness improving film that is relatively expensive. As a result, a cost required for manufacturing the backlight assembly according to the exemplary embodiments of the present invention may be relatively low as compared to a backlight assembly having a dual brightness improving film.

BRIEF DESCRIPTION OF THE DRAWINGS

The above and other advantages of the present invention will become readily apparent by reference to the following detailed description when considered in conjunction with the accompanying drawings in which.

DETAILED DESCRIPTION OF THE INVENTION

Figure 1:
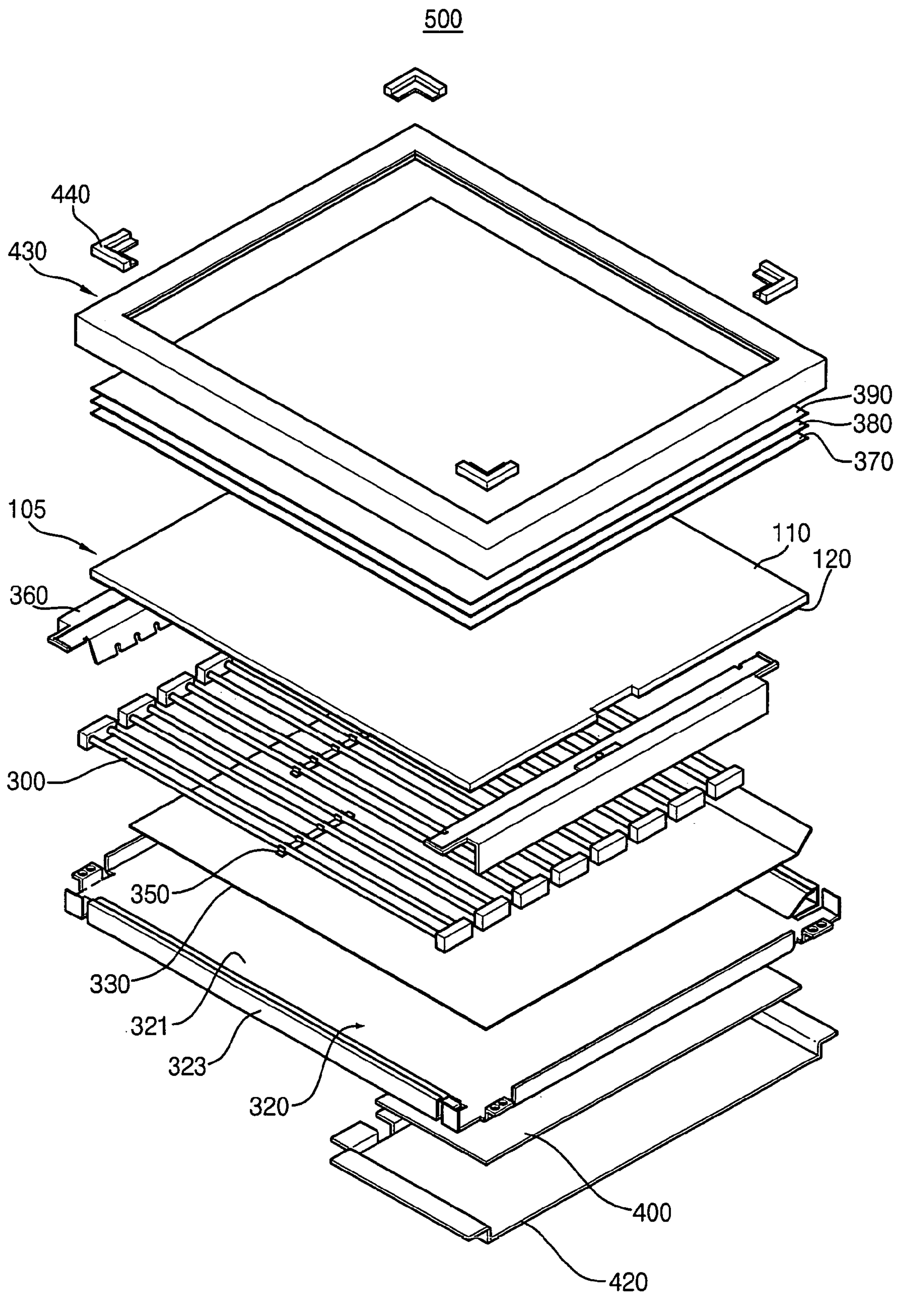
FIG. 1 is an exploded perspective view illustrating an exemplary embodiment of a backlight assembly in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that when an element or layer is referred to as being "on" or "connected to" another element or layer, it can be directly on or directly connected to the other element or layer or intervening elements or layers may be present.

Like reference numerals refer to like elements throughout.

It will be further understood that, although the terms first, second, etc. may be used herein to describe various elements, components or layers, these elements, components or layers should not be limited by these terms. These terms are only used to distinguish one element, component or layer from another element, component or layer. Thus, a first element, component or layer discussed below could be termed a second element, component or layer without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For Example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, elements or components, but do not preclude the presence or addition of one or more other features, elements or components.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments of the present invention will now be described with reference to the accompanying drawings.

Figure 2:
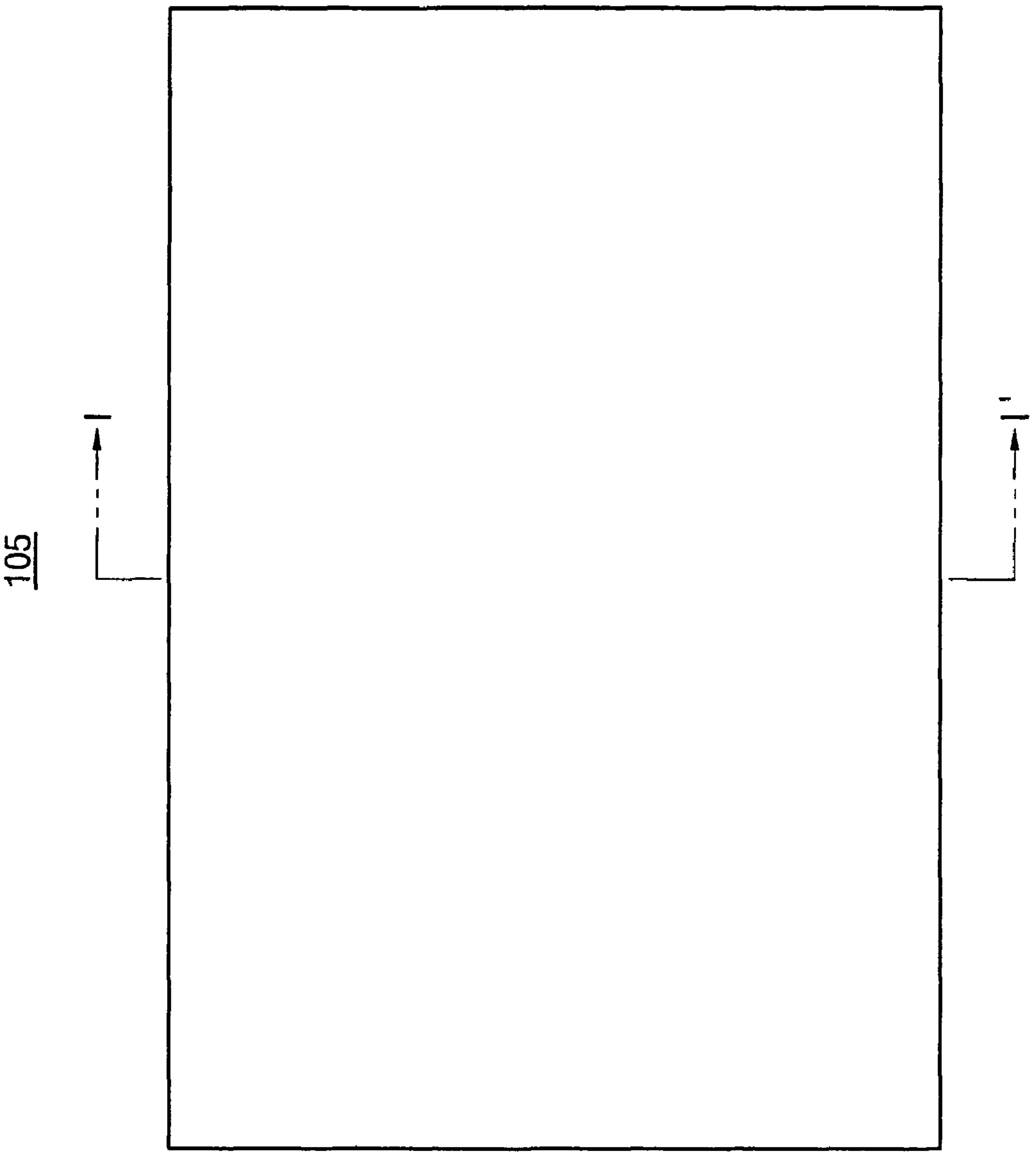
FIG. 2 is a plan view illustrating an exemplary light dispersion member in FIG. 1.
Figure 3:
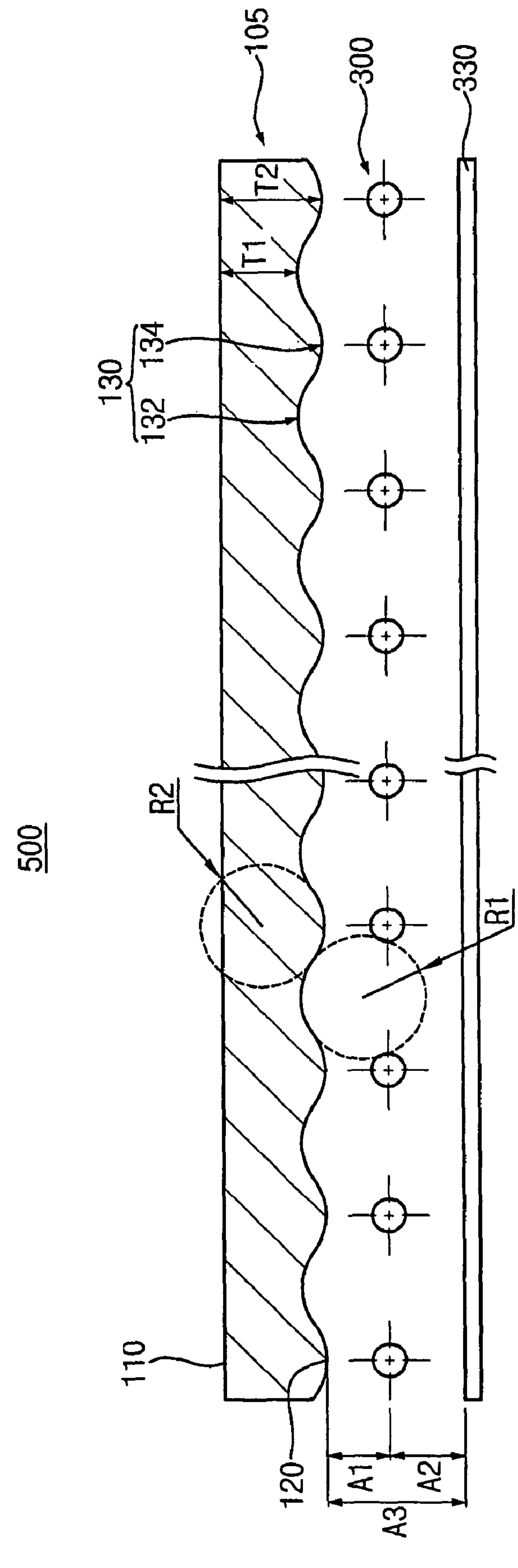
FIG. 3 is a cross-sectional view taken along line I-I' in FIG. 2.

FIG. 1 is an exploded perspective view illustrating an exemplary embodiment of a backlight assembly in accordance with the present invention. FIG. 2 is a plan view illustrating an exemplary light dispersion member in FIG. 1. FIG. 3 is a cross-sectional view taken along line I-I' in FIG. 2.

Referring to FIGS. 1 to 3, a backlight assembly 500 includes a light dispersion member 105, a light source 300, and a reflection plate 330.

The light dispersion member 105 has a first face 110 and a second face 120 opposite the first face 110. The light dispersion member 105 has a rectangular plate shape, although other shapes would also be within the scope of these embodiments. The light dispersion member 105 may include polymethylmethacrylate ("PMMA"). A light incident onto the second face 120 of the light dispersion member 105 is dispersed in the light dispersion member 105. The light is then irradiated from the first face 110 of the light dispersion member 105.

The first face 110 is substantially even, that is, substantially planar, such as illustrated in FIG. 3. On the other hand, an optical member 130 is formed at a lower face portion of the light dispersion member 105 so that the second face 120 may be substantially uneven and therefore not planar. Because the second face 120 is substantially uneven, brightness and brightness uniformity of the light irradiated from the first face 110 of the light dispersion member 105 may be improved.

Referring to FIG. 3, the optical member 130 includes at least one groove 132 and at least one ridge 134. Each groove 132 is connected to at least one of the ridges 134.

The grooves 132 are formed at the lower face portion of the light dispersion member 105. The grooves 132 are spaced apart from each other by a predetermined interval. The grooves 132 extend in a direction parallel to a side of the backlight assembly and are substantially in parallel with each other. The groove 132 has a first radius of curvature R1. The first radius of curvature R1 may be from about 0.5 mm to about 1 mm.

In detail, the ridges 134 and the grooves 132 are alternately formed at the lower face portion of the light dispersion member 105. The ridge 134 is connected between the grooves 132 that are adjacent to each other. In other words, the groove 132 is connected between the ridges 134 that are adjacent to each other. Thus, the ridges 134 are also parallel to each other and to the grooves 132.

Each ridge 134 has a second radius of curvature R2. The second radius of curvature R2 may be from about 0.5 mm to about 1 mm. The ridge 134 may have a semicircular cylindrical shape. In other words, the ridge 134 has a cross-section of an arc shape of a circle, and extends across a surface of the light dispersion member 105. While a semicircular cylindrical shape is described, other shapes would also be within the scope of these embodiments.

In order to efficiently improve the brightness and the brightness uniformity, a first thickness T1 of a first portion of the light dispersion member 105 and a second thickness T2 of a second portion of the light dispersion member 105 are precisely controlled. Here, the first portion is where the groove 132 is formed and the second portion is where the ridge 134 is formed. The first thickness T1 may be from about 1.5 mm to about 2.0 mm. The first thickness T1 is measured at the thinnest point of the light dispersion member 105, and the second thickness T2 is measured at the thickest point of the light dispersion member 105.

Figure 4:
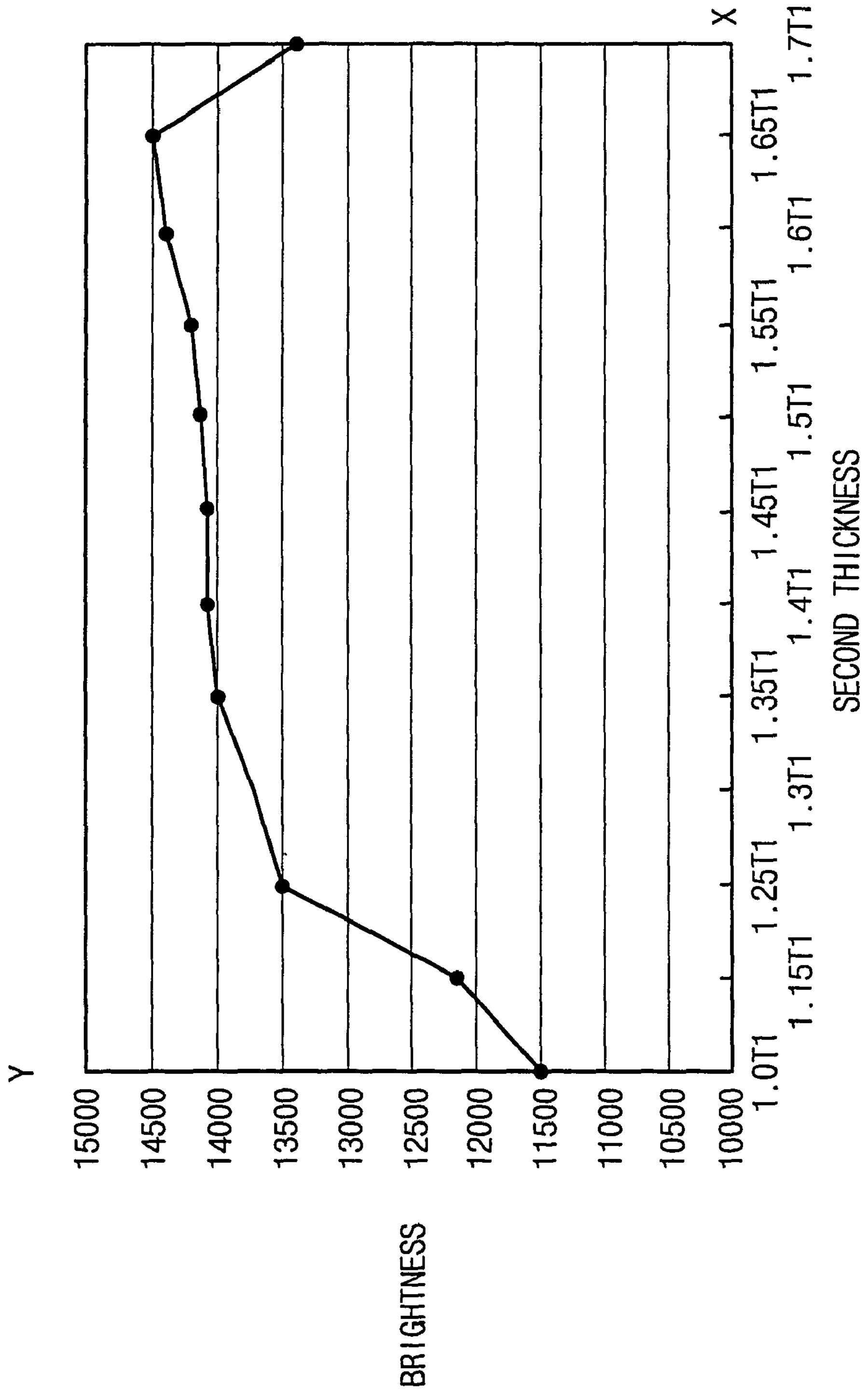
FIG. 4 is a graph showing a brightness distribution of the light irradiated from a first face of the exemplary light dispersion member in FIG. 3.

FIG. 4 is a graph showing a brightness distribution of the light irradiated from the first face of the exemplary light dispersion member in FIG. 3.

Referring to FIGS. 3 and 4, an X-axis of the graph indicates the second thickness T2 of the light dispersion member 105. A Y-axis of the graph indicates the brightness of the light irradiated from the first face 110 of the light dispersion member 105.

For the results depicted in the graph of FIG. 4, the light dispersion member 105 included PMMA. The first radius of curvature R1 was about 0.5 mm. The second radius of curvature R2 was about 1 mm. The light source 300 providing the light dispersion member 105 with the light was positioned directly under the ridge 134. An interval between each ridge 134 and each respective light source member in the light source 300 was about 11.8 mm. An interval between the light source members in the light source 300 that were adjacent to each other was about 20.0 mm. The brightness of the light irradiated from the first face 110 of the light dispersion member 105 was an average of first to ninth brightnesses measured at first to ninth measurement points positioned on the first face 110.

Referring to FIG. 4, when the second thickness T2 increases from about 1.0 to about 1.80 times the first thickness T1, the brightness of the light irradiated from the first face 110 substantially increases.

An increase of the brightness in accordance with an increase of the second thickness T2 is shown in Table 1.

TABLE 1

| | Second thickness | Brightness (nit) |
|---|---|---|
| Comparative Example 1 | 1.0T1 | 11500 |
| Example 1 | 1.15T1 | 12140 |
| | 1.25T1 | 13476 |
| | 1.3T1 | 13720 |
| | 1.35T1 | 13980 |
| Example 2 | 1.4T1 | 14050 |
| | 1.45T1 | 14080 |
| | 1.5T1 | 14130 |
| | 1.55T1 | 14220 |
| Example 3 | 1.6T1 | 14400 |
| | 1.67T1 | 14500 |
| Example 4 | 1.70T1 | 13400 |

In Comparative Example 1, the second thickness T2 was substantially identical to the first thickness T1, that is, T2=1.0T1. The brightness of the light irradiated from the first face 110 of the light dispersion member 105 was about 11,500nit. Here, a "nit" is a measurement of the light in candelas per meter square "$Cd/m^2$".

In Example 1, the second thickness T2 was about 1.15 times the first thickness T1, about 1.25 times the first thickness T1, about 1.3 times the first thickness T1, or about 1.35 times the first thickness T1.

In Example 1, when the second thickness T2 of the light dispersion member 105 was about 1.15 times the first thickness T1, the brightness of the light irradiated from the first face 110 of the light dispersion member 105 was about 12,140nit. Thus, the brightness when T2=1.15T1 was larger than that of Comparative Example 1.

In Example 1, when the second thickness T2 of the light dispersion member 105 was about 1.25 times the first thickness T1, the brightness of the light irradiated from the first face 110 of the light dispersion member 105 was about 13,476nit. Thus, the brightness when T2=1.25T1 was larger than that of Comparative Example 1, and larger than when T2=1.15T1.

In Example 1, when the second thickness T2 of the light dispersion member 105 was about 1.30 times the first thickness T1, the brightness of the light irradiated from the first face 110 of the light dispersion member 105 was 13,720nit. Thus, the brightness when T2=1.3T1 was larger than that of Comparative Example 1, and larger than when T2=1.15T1 and when T2=1.25T1.

In Example 1, when the second thickness T2 of the light dispersion member 105 was 1.35 times the first thickness T1, the brightness of the light irradiated from the first face 110 of the light dispersion member 105 was 13,980nit. Thus, the brightness when T2=1.35T1 was larger than that of Comparative Example 1, and larger than when T2=1.15T1, 1.25T1, and 1.3T1.

Accordingly, the brightnesses of Example 1 were larger than that of Comparative Example 1 and the brightnesses increased as T2 increased from 1.15T to 1.35T1.

In Example 2, the second thickness T2 was about 1.40 times the first thickness T1, about 1.45 times the first thickness T1, about 1.50 times the first thickness T1, or about 1.55 times the first thickness T1.

In Example 2, when the second thickness T2 of the light dispersion member 105 was about 1.40 times the first thickness T1, the brightness of the light irradiated from the first face 110 of the light dispersion member 105 was about 14,050nit. Thus, the brightness when T2=1.4T1 was larger than that of Comparative Example 1 and larger than that of Example 1.

In Example 2, when the second thickness T2 of the light dispersion member 105 was about 1.45 times the first thickness T1, the brightness of the light irradiated from the first face 110 of the light dispersion member 105 was about 14,080nit. Thus, the brightness when T2=1.45 T1 was larger than that of Comparative Example 1, Example 1, and larger than when T2=1.4T1.

In Example 2, when the second thickness T2 of the light dispersion member 105 was 1.50 times the first thickness T1, the brightness of the light irradiated from the first face 110 of the light dispersion member 105 was about 14,130nit. Thus, the brightness when T2=1.5T1 was larger than that of Comparative Example 1, Example 1, and larger than when T2=1.4T1 and 1.45T1.

In Example 2, when the second thickness T2 of the light dispersion member 105 was about 1.55 times the first thickness T1, the brightness of the light irradiated from the first face 110 of the light dispersion member 105 was about 14,220nit. Thus, the brightness when T2=1.55T1 was larger than that of Comparative Example 1, Example 1, and larger than when T2=1.4T1, 1.45T1, and 1.5T1.

Accordingly, the brightnesses of Example 2 were larger than that of Comparative Example 1, and larger than that o Example 1. Also, the brightnesses in Example 2 increased as T2 increased from 1.4T1 to 1.55T1.

In Example 3, the second thickness T2 was about 1.60 times the first thickness T1 or about 1.67 times the first thickness T1.

In Example 3, when the second thickness T2 of the light dispersion member 105 was about 1.60 times the first thickness T1, the brightness of the light irradiated from the first face 110 of the light dispersion member 105 was about 14,400nit. Thus, the brightness when T2=1.6T1 was larger than that of Comparative Example 1, Example 1, and Example 2.

In Example 3, when the second thickness T2 of the light dispersion member 105 was about 1.67 times the first thickness T1, the brightness of the light irradiated from the first face 110 of the light dispersion member 105 was about 14,500nit. Thus, the brightness when T2=1.67T1 was larger than that of Comparative Example 1, Example 1, Example 2, and larger than when T2=1.6 T1.

Accordingly, the brightnesses of Example 3 were larger than that of Comparative Example 1, Example 1, and Example 2. Also, the brightnesses in Example 3 increased as T2 increased from 1.6T1 to 1.67T1.

In Example 4, the second thickness T2 was about 1.70 times the first thickness T1.

In Example 4, the brightness of the light irradiated from the first face 110 of the light dispersion member 105 was about 13,400nit. Thus, the brightness was larger than that of Comparative Example 1, although smaller than that of Examples 2 and 3.

Although it is not particularly shown in FIG. 4, when the second thickness T2 increased from about 1.70 times the first thickness T1, the brightness of the light irradiated from the first face 110 of the light dispersion member 105 gradually decreased.

In addition, although it is not particularly shown in FIG. 4, when the second thickness T2 was about 1.80 times the first thickness T1, the brightness was substantially identical to that of Comparative Example 1.

As a result, a variation of the brightness is related to the first thickness T1 and the second thickness T2. The brightness measured when the second thickness T2 was from about 1.15 to about 1.80 times the first thickness T1 was larger than that measured when the second thickness T2 was substantially identical to the first thickness T1.

Referring to FIG. 4 and Table 1, when the second thickness T2 was about 1.67 times the first thickness T1, the brightness of the light irradiated from the first face 110 of the light dispersion member 105 was exceedingly high.

The brightness of the light irradiated from the light dispersion member 105 including the optical member 130 having the groove 132 and the ridge 134 may be determined by Formula 1 and Formula 2, as will be further described below.

Data required for determining the brightness may be a distance D, a height H, the first radius of curvature R1, the second radius of curvature R2, and the second thickness T2. Here, the distance D is measured between the light source members of the light source 300 that are adjacent to each other. The height H is measured between a light source member in the light source 300 and a respective ridge 134.

The distance D, the height H, the first radius of curvature R1, the second radius of curvature R2, and the second thickness T2 are given by Table 2.

TABLE 2

| Number | D(mm) | H(mm) | R2(mm) | R1(mm) | T2 (mm) | Brightness (nit) | Uniformity (%) |
|---|---|---|---|---|---|---|---|
| 1 | 20 | 11.8 | 0.5 | 0.5 | 2 | 14200 | 77 |
| 2 | 30 | 11.8 | 0.5 | 0.5 | 1 | 13200 | 69 |
| 3 | 20 | 17.6 | 0.5 | 0.5 | 1 | 13420 | 78 |
| 4 | 30 | 17.6 | 0.5 | 0.5 | 2 | 12800 | 76 |
| 5 | 20 | 11.8 | 1 | 0.5 | 1 | 12980 | 87 |
| 6 | 30 | 11.8 | 1 | 0.5 | 2 | 13200 | 92 |
| 7 | 20 | 17.6 | 1 | 0.5 | 2 | 12600 | 90 |
| 8 | 30 | 17.6 | 1 | 0.5 | 1 | 12900 | 85 |
| 9 | 20 | 11.8 | 0.5 | 1 | 1 | 13600 | 88 |
| 10 | 30 | 11.8 | 0.5 | 1 | 2 | 13100 | 81 |
| 11 | 20 | 17.6 | 0.5 | 1 | 2 | 13000 | 86 |

TABLE 2-continued

| Number | D(mm) | H(mm) | R2(mm) | R1(mm) | T2 (mm) | Brightness (nit) | Uniformity (%) |
|---|---|---|---|---|---|---|---|
| 12 | 30 | 17.6 | 0.5 | 1 | 1 | 13300 | 84 |
| 13 | 20 | 11.8 | 1 | 1 | 2 | 13350 | 81 |
| 14 | 30 | 11.8 | 1 | 1 | 1 | 13450 | 72 |
| 15 | 20 | 17.6 | 1 | 1 | 1 | 12700 | 77 |
| 16 | 30 | 17.6 | 1 | 1 | 2 | 12300 | 79 |

Here, the brightness and the brightness uniformity are simulation results.

The data in Table 2 are analyzed by a statistical analysis software so that the brightness of the light irradiated from the first face 110 of the light dispersion member 105 may be predicted.

The statistical analysis software may be Minitab™ statistical software. When Minitab™ software of Minitab, Inc. in USA is employed as the statistical analysis software, an accuracy of the brightness may be no less than about 95%.

The brightness may also vary in accordance with a total coefficient, a distance coefficient, a height coefficient, a first radius of curvature coefficient, a second radius of curvature coefficient, and a second thickness coefficient.

In detail, the total coefficient is about 15787.5. The distance coefficient is about −20.0. The height coefficient is about −87.5. The first radius of curvature coefficient is about −125. The second radius of curvature coefficient is about −785.0. The second thickness coefficient is about −125.

$$\text{Brightness}(nit)=15787.5-20D-87.5H-785R2-125R1-125T2 \quad \text{[Formula 1]}$$

Formula 1 and the datum concerning the distance D, the height H, the first radius of curvature R1, the second radius of curvature R2 and the first thickness T2 together may determine the brightness of the light irradiated from the first face 110 of the light dispersion member 105. An accuracy of the brightness may be no less than about 95%.

The data in Table 2 are also analyzed by the statistical analysis software so that the brightness uniformity of the light irradiated from the first face 110 of the light dispersion member 105 may be predicted.

The statistical analysis software may be the Minitab™ statistical software. When Minitab™ software of Minitab, inc. in USA is employed as the statistical analysis software, an accuracy of the brightness uniformity may be no less than about 95%.

The brightness uniformity may also vary in accordance with a total coefficient, a distance coefficient, a height coefficient, a first radius of curvature coefficient, a second radius of curvature coefficient, and a second thickness coefficient.

In detail, the total coefficient is about 43.47. The distance coefficient is about −0.325. The height coefficient is about 0.172. The first radius of curvature coefficient is about 61.5. The second radius of curvature coefficient is about 54. The second thickness coefficient is about 4.75.

$$\text{Brightness uniformity }(\%)=43.47-0.325D+0.172H+54R2+61.5R1-4.75T2 \quad \text{[Formula 2]}$$

Formula 2 and the data concerning the distance D, the height H, the first radius of curvature R1, the second radius of curvature R2, and the second thickness T2 together may determine the brightness uniformity of the light irradiated from the first face 110 of the light dispersion member 105. An accuracy of the brightness uniformity may be no less than about 95%.

Figure 5:
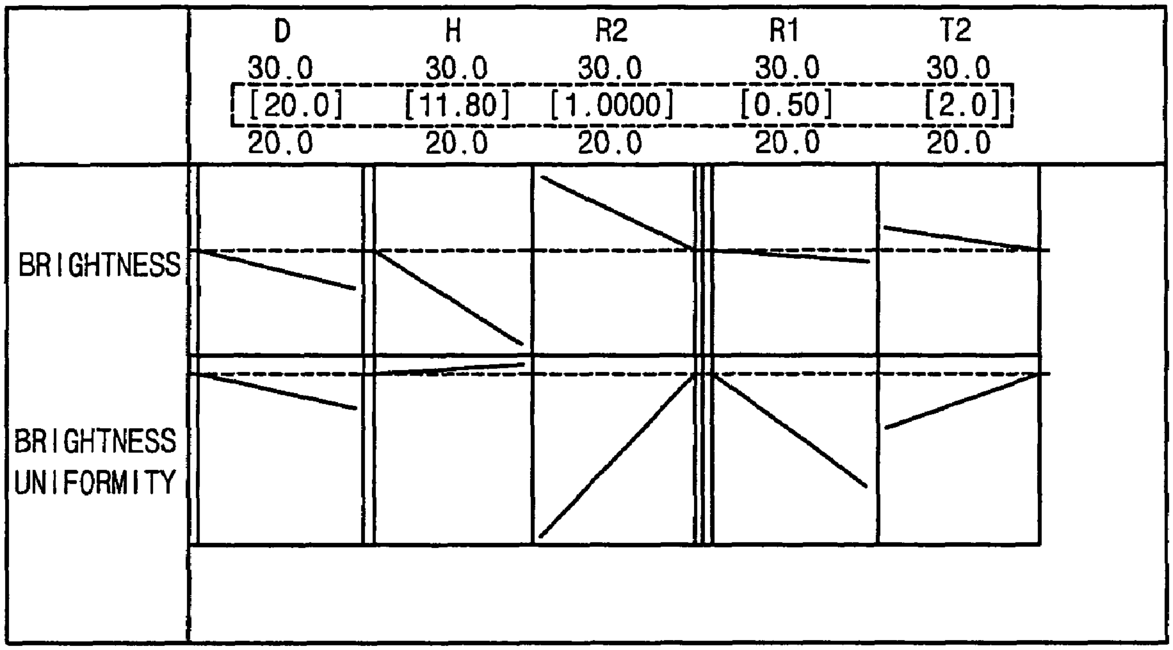
FIG. 5 is a graph showing brightness and brightness uniformity as analyzed by statistical analysis software.

FIG. 5 is a graph showing the brightness and the brightness uniformity that are analyzed by the statistical analysis software.

Referring to Table 2 and FIG. 5, when the distance D, the height H, the second radius of curvature R2, the first radius of curvature R1, and the second thickness T2 are respectively about 20 mm, about 11.8 mm, about 1.0 mm, about 0.5 mm, and about 2.0 mm, the brightness and the brightness uniformity are relatively high. In detail, the brightness and the brightness uniformity are 13,260nit and 92.25%, respectively.

The light source 300 faces the second face 120 of the light dispersion member 105 and corresponds to the ridge 134 of the light dispersion member 105. That is, the light source members in the light source 300 are positioned directly under each ridge 134 of the light dispersion member 105.

The light source 300 may be a cold cathode lamp ("CCFL") having a cylindrical shape. However, many apparent variations of shapes of the light source 300 are possible. As one example, the light source 300 has a bar shape. As another example, the light source 300 has a U-shape. As still another example, the light source 300 has a C-shape. Each light source member in the light source 300 may have a same shape as the other light source members in the light source 300. Alternatively, the light source members may be shaped differently from each other to be accommodated within the backlight assembly 500.

The reflection plate 330 is opposite to the second face 120 of the light dispersion member 105. The light source 300 is positioned between the reflection plate 330 and the light dispersion member 105. A light incident on the reflection plate 330 may be reflected toward the light dispersion member 105.

A first interval A1 and a second interval A2 may largely affect the brightness and the brightness uniformity of the light irradiated from the first face 110 of the dispersion member 105. The first interval A1 is measured between the ridge 134 and a central axis, such as a longitudinal axis, of the light source 300. The second interval A2 is measured between the central axis of the light source 300 and the reflection plate 330. It should be understood that the first interval A1 may be the same between each ridge and each corresponding light source member in the light source 300. Likewise, the second interval A2 may be the same between each light source member in the light source 300 and the reflection plate 330.

Hereinafter, relations between the brightness and the first interval A1 and between the brightness uniformity and the first interval A1 are described.

Figure 6:
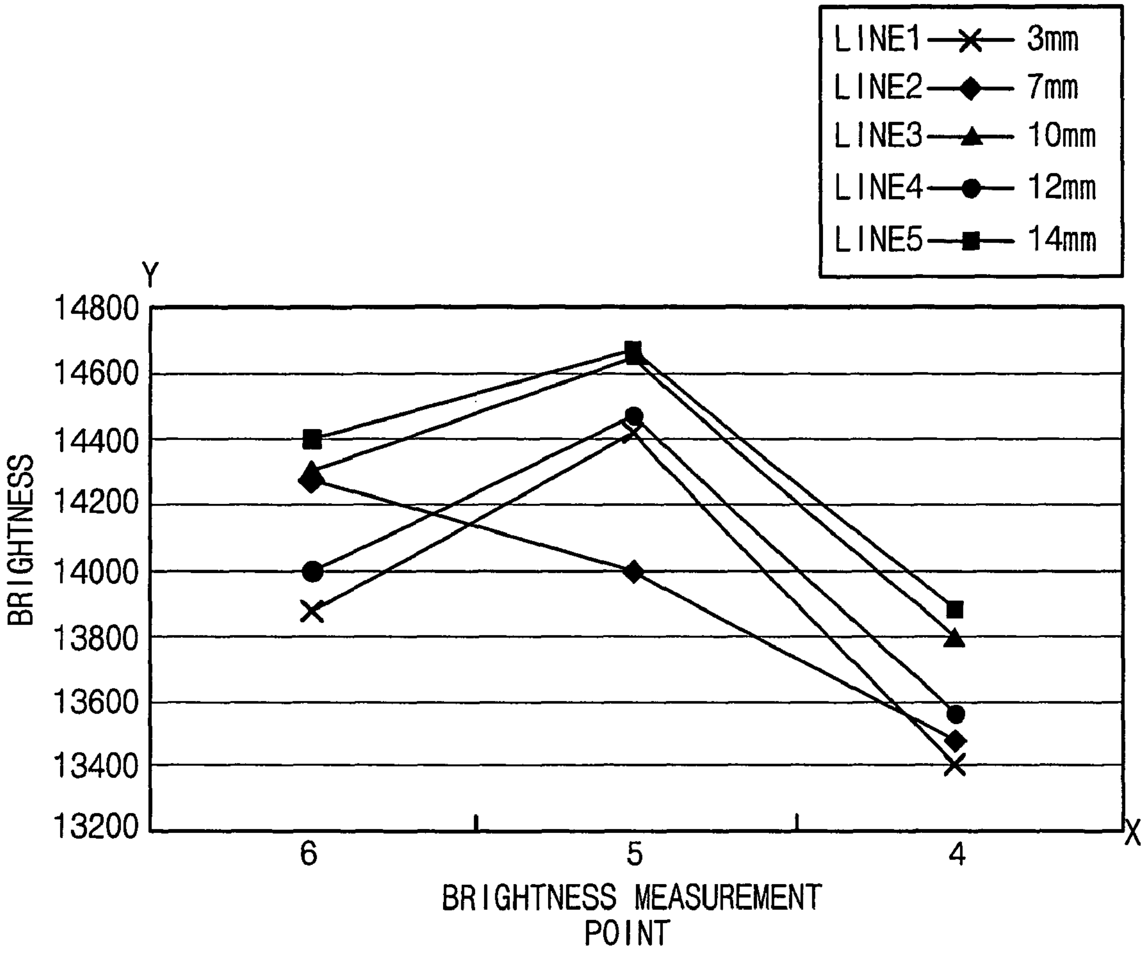
FIG. 6 is a graph showing a relation between brightness and a first interval A1 in FIG. 3.

Brightness Variation Experiment in Accordance with the First Interval A1 Between the Ridge and the Central Axis of the Light Source FIG. 6 is a graph showing a relation between the brightness and the first interval A1 in FIG. 3.

Referring to FIGS. 3 and 6, the distance D between the light source members in the light source 300 that were adjacent to each other was about 25.4 mm. Each light source member in the light source 300 was positioned under a respective ridge 134 of the light dispersion member 105. An X-axis of the graph in FIG. 6 indicates a brightness measurement point. A Y-axis of the graph in FIG. 6 indicates the brightness.

Line 1 shows the brightness measured when the first interval A1 in FIG. 3 was about 3 mm. Line 2 shows the brightness measured when the first interval A1 in FIG. 3 was about 7 mm. Line 3 shows the brightness measured when the first interval A1 in FIG. 3 was about 10 mm. Line 4 shows the brightness measured when the first interval A1 was about 12 mm. Line 5 shows the brightness measured when the first interval A1 in FIG. 3 was about 14 mm.

As shown in FIG. 6, when the first interval A1 between the ridge 134 and the central axis of the light source member in the light source 300 was from about 7 mm to about 12 mm, the brightness of the light irradiated from the first face 110 of the light dispersion member 105 was suitable for displaying an image. However, when the first interval A1 was no more than about 3 mm or no less than a bout 14 mm, the brightness of the light irradiated from the first face 110 of the light dispersion member 105 was not suitable for displaying the image.

Although it is not particularly shown in FIG. 6, when the first interval A1 was about 3 mm, the brightness uniformity of the light irradiated from the first face 110 of the light dispersion member 105 was about 83.3%. When the first interval A1 was about 7 mm, the brightness uniformity of the light irradiated from the first face 110 of the light dispersion member 105 was about 92.2%. When the first interval A1 was about 10 mm, the brightness uniformity of the light irradiated from the first face 110 of the light dispersion member 105 was about 93.3%. When the first interval A1 was about 12 mm, the brightness uniformity of the light irradiated from the first face 110 of the light dispersion member 105 was about 90.2%. In case that the first interval A1 was about 14 mm, the brightness uniformity of the light irradiated from the first face 110 of the light dispersion member 105 was about 90.2%.

As described above, when the first interval A1 was from about 7 mm to about 14 mm, the brightness uniformity of the light irradiated from the first face 110 of the light dispersion member 105 was no less than about 90%. That is, when the first interval A1 between the ridge 134 and the central axis of the light source member in the light source 300 is from about 7 mm to about 14 mm, a display quality was relatively high.

On the other hand, when the first interval A1 between the ridge 134 and the central axis of the light source member in the light source 300 was less than about 3 mm, the brightness uniformity of the light irradiated from the first face 110 of the light dispersion member 105 was about 83%. That is, when the first interval A1 was no more than about 3 mm, the display quality was relatively low, because bright lines generated from the light source 300 have unfortunately affected the display quality.

Thus, it is preferable that the first interval A1 between the ridge 134 and the central axis of the light source member of the light source 300 is from about 7 mm to about 12.5 mm with consideration of both the brightness and the brightness uniformity.

In accordance with an exemplary embodiment of the present invention, the first interval A1 may be from about 0.2 to about 0.55 times the distance D. In particular, when the first interval A1 is from 0.286 to about 0.51 times the distance D, the display quality is relatively high. Thus, it is preferable that the first interval A1 is from about 0.286 to about 0.51 times the distance D.

Hereinafter, a relation between the brightness and the second interval A2 is described. As described above, the second interval A2 is measured between the central axis of the light source member in the light source 300 and the reflection plate 330.

Figure 7:
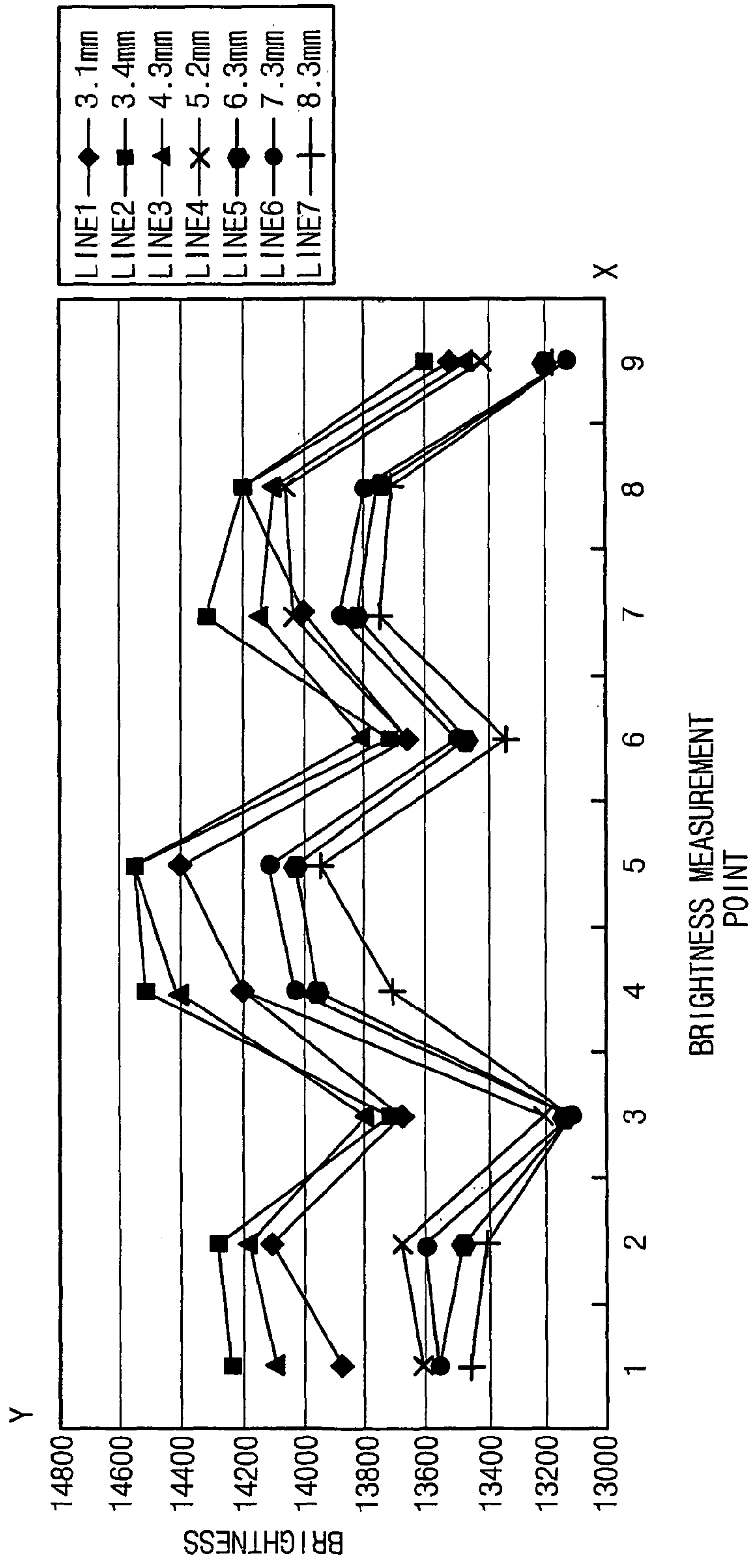
FIG. 7 is a graph showing a relation between brightness and a second interval A2 in FIG. 3.

Brightness Variation Experiment in Accordance with the Second Interval A2 between the Central Axis of the Light Source and the Reflection Plate FIG. 7 is a graph showing a relation between the brightness and the second interval A2 in FIG. 3.

Referring to FIGS. 3 and 7, the distance D between the light source members in the light source 300 that were adjacent to each other was about 25.4 mm. As described above, each light source member in the light source 300 was positioned directly under each respective ridge 134 of the light dispersion member 105. An X-axis of the graph in FIG. 7 indicates a brightness measurement point. A Y-axis of the graph in FIG. 7 indicates the brightness.

Line 1 shows the brightness measured when the second interval A2 in FIG. 3 was about 3.1 mm. Line 2 shows the brightness measured when the second interval A2 in FIG. 3 was about 3.4 mm. Line 3 shows the brightness measured when the second interval A2 in FIG. 3 was about 4.3 mm. Line 4 shows the brightness measured when the second interval A2 in FIG. 3 was about 5.2 mm. Line 5 shows the brightness measured when the second interval A2 in FIG. 3 was about 6.3 mm. Line 6 shows the brightness measured when the second interval A2 in FIG. 3 was about 7.3 mm. Line 7 shows the brightness measured when the second interval A2 in FIG. 3 was about 8.3 mm.

As shown in FIG. 7, when the second interval A2 between the central axis of the light source member in the light source 300 and the reflection plate 330 was from about 3.4 mm to about 5.2 mm, the brightness of the light irradiated from the first face 110 of the light dispersion member 105 was suitable for displaying an image. However, when the second interval A2 was less than 3.1 mm or greater than 7.3 mm, the brightness of the light irradiated from the first face 110 of the light dispersion member 105 was not suitable for displaying the image.

Thus, it is preferable that the second interval A2 between the central axis of the light source member in the light source 300 and the reflection plate 330 is from about 3.1 mm to about 5.4 mm in consideration of the brightness.

In accordance with an exemplary embodiment of the present invention, the distance D between the light sources that are adjacent to each other is about 25.4 mm. However, it should be understood that alternate sizes of the overall display device incorporating the exemplary backlight assembly may alter the distance D between the light sources within the backlight assembly, and therefore the spacing described herein is exemplary only.

In accordance with an exemplary embodiment of the present invention, the second interval A2 may be from about 0.10 to about 0.25 times the distance D. In particular, when the second interval A2 is from about 0.139 to about 0.212 times the distance D, the display quality is relatively high. Thus, the second interval A1 is preferably from about 0.139 to about 0.212 times the distance D.

Hereinafter, variations of the brightness and the brightness uniformity in accordance with variations of the first interval A1 and the second interval A2 are described.

Comparative Experiment

TABLE 3

| A3 | A2 | A1 | | Measurement point 9 | 8 | 7 | 6 | 5 | 4 | 3 | 2 | 1 | nit | % |
|---|---|---|---|---|---|---|---|---|---|---|---|---|---|---|
| 13.5 | 3.5 | 10.0 | E5 | 13370 | 13130 | 12820 | 13520 | 13290 | 12780 | 12900 | 12740 | 12700 | 13027 | 93.9 |
| (mm) | (mm) | (mm) | E6 | 12700 | 13290 | 12700 | 12780 | 12980 | 12860 | 12780 | 13250 | 12980 | 12906 | 95.6 |
| | | | E7 | 13640 | 13760 | 12780 | 14390 | 13840 | 13520 | 12860 | 13090 | 12350 | 13372 | 85.8 |
| | | | E8 | 13640 | 13640 | 12900 | 13880 | 13680 | 13560 | 13520 | 13560 | 13170 | 13462 | 92.9 |
| 22.1 | 6 | 16.1 | C2 | 12070 | 12390 | 12030 | 12900 | 12900 | 12470 | 12500 | 12470 | 12030 | 12408 | 93.3 |

Here, "E5", "E6", "E7", "E8" and "C2" indicate Example 5, Example 6, Example 7, Example 8, and Comparative Example 2, respectively.

Referring to Table 3, in Comparative Example 2, a first interval A1, a second interval A2 and a third interval A3 were about 16.1 mm, about 6 mm and about 22.1 mm, respectively.

The second interval A2 was measured between a central axis of a light source and a reflection plate. The first interval A1 was measured between a light dispersion member and the central axis of the light source. The third interval A3 was measured between the light dispersion member and the reflection plate. Thus, the third interval A3 is the sum of the first interval A1 and the second interval A2.

According to Comparative Example 2, the brightness of the light irradiated from the first face 110 of the light dispersion member 105 was about 12,408nit. Here, the brightness was an average of first to ninth brightnesses measured at first to ninth measurement points positioned on a face of the light dispersion member, the first face being positioned where a light was irradiated. In addition, the brightness uniformity of the light irradiated from the first face 110 of the light dispersion member 105 was about 93.3%.

Referring to Table 3, in Examples 5 to 8, the second interval A2 and the first interval A1 were about 3.5 mm and about 10.0 mm, respectively.

In Example 5, the light dispersion member 105 was a dispersion plate that has no dispersion pattern. According to Example 5, the brightness of the light irradiated from the first face 110 of the light dispersion member 105 was about 13,027nit. Here, the brightness was an average of first to ninth brightnesses measured at first to ninth measurement points of a face of the dispersion plate, the face being where a light was irradiated. In addition, the brightness uniformity of the light irradiated from the first face 110 of the light dispersion member 105 was about 93.0%. That is, the brightness of Example 5 was larger than that of Comparative Example 2.

In Example 6, the light dispersion member 105 was a dispersion plate that having a dispersion pattern. According to Example 6, the brightness of the light irradiated from the first face 110 of the light dispersion member 105 was about 12,906nit. Here, the brightness was an average of first to ninth brightnesses measured at first to ninth measurement points of a face of the dispersion plate, the first face being positioned where a light was irradiated. In addition, the brightness uniformity of the light irradiated from the first face 110 of the light dispersion member 105 was about 95.6%. Thus, the brightness of Example 6 was substantially larger than that of Comparative Example 2.

In Example 7, the light dispersion member 105 was a light guide panel. According to Example 7, the brightness of the light irradiated from the first face 110 of the light dispersion member 105 was about 13,372nit. Here, the brightness was an average of first to ninth brightnesses measured at first to ninth measurement points of a face of the light guide panel, the face being positioned where a light was irradiated. In addition, the brightness uniformity of the light irradiated from the first face 110 of the light dispersion member 105 was about 85.5%.

Thus, the brightness of Example 7 was substantially larger than that of Comparative Example 2, although the brightness uniformity is less.

In Example 8, the light dispersion member 105 was a dispersion plate including a lower face on which a light was incident. The lower face had a wave shape substantially identical to that previously illustrated in FIG. 3. According to Example 8, the brightness of the light irradiated from the first face 110 of the light dispersion member 105 was about 13,462nit. Here, the brightness was an average of first to ninth brightnesses measured at first to ninth measurement points of an upper face of the dispersion plate, the upper face being positioned where a light was irradiated. In addition, the brightness uniformity of the light irradiated from the first face 110 of the light dispersion member 105 was about 92.0%. Thus, the brightness of Example 8 was substantially larger than that of Comparative Example 2.

According to Table 3, the brightness and the brightness uniformity may be improved by varying the first interval A1 between the light dispersion member 105 and the light source 300 and the second interval A2 between the light source 300 and the reflection plate 330.

In addition, as shown in Table 3, when the light dispersion member has a plate shape, the brightness and the brightness uniformity may be improved only by varying the first interval A1 and the second interval A2. That is, if the plate shape does not have the dispersion pattern of the exemplary embodiments of the present invention, then brightness and brightness uniformity cannot be improved by defining the relative thicknesses of T1 and T2 as in the present invention, and can only attempt to improve brightness and brightness uniformity by varying the first interval A1 and the second interval A2.

Referring again to FIG. 1, the backlight assembly 500 includes the light dispersion member 105, and a receiving container 320. The receiving container 320 receives the light source 300 therein.

The receiving container 320 includes a bottom plate 321 and a sidewall 323. The bottom plate 321 may be generally rectangular in shape, although other shapes are within the scope of these embodiments. The sidewall 323 extends from a peripheral edge of the bottom plate 321. The bottom plate 321 and the sidewall 323 together define a receiving recess in which the light dispersion member 105 and the light source 300 are received.

The backlight assembly 500 may also include an inverter 400. The inverter 400 may be positioned beneath the bottom plate 321 of the receiving container 320. That is, a first surface of the bottom plate 321 faces the light source 300, a second surface of the bottom plate 321 faces away from the light source 300, and the inverter 400 may be positioned on this second surface of the bottom plate 321. The inverter 400 provides the light source 300 with a drive power enabling the light source 300 to generate light.

The backlight assembly 500 may also include a shield case 420. The inverter 400 is covered with the shield case 420 so that a harmful microwave generated from the inverter 400 may be blocked by the shield case 420. The shield case 420 may be combined with the bottom plate 321.

The backlight assembly 500 may include the reflection plate 330. The reflection plate 330 is positioned between the light source 300 and the bottom plate 321 of the receiving container 320. That is, the reflection plate 330 is positioned on the first surface of the bottom plate 321 of the receiving container 320. The reflection plate 330 reflects the light incident thereon toward the light dispersion member 105. Thus, an amount of the light incident on the light dispersion member 105 may increase.

The backlight assembly 500 may include a light source supporter 350. The light source members in the light source 300 are fixed to the light source supporter 350. The light source supporter 350 is fixed to the receiving container 320. Thus, the light source 300 is also fixed to the receiving container 320. Alternatively, the light source supporter 350 is fixed to the reflection plate 330 fixed to the receiving container 320.

The backlight assembly 500 includes a mold frame 360 covering an end portion of the light source 300. The mold frame 360 may support the light dispersion member 105 thereon. The mold frame 360 may extend substantially perpendicularly to a longitudinal direction of the light source members in the light source 300.

A combination recess is formed at a sidewall portion of the light dispersion member 105. A combination protrusion upwardly protrudes from the mold frame 360. The combination recess of the light dispersion member 105 corresponds to the combination protrusion of the mold frame 360. The combination recess of the light dispersion member 105 is combined with the combination protrusion of the mold frame 360 so that the light dispersion member 105 may not substantially drift with respect to the mold frame 360.

Alternatively, the light dispersion member 105 includes a combination protrusion downwardly protruding from a sidewall portion of the light dispersion member 105. In this case, the mold frame 360 would include a combination recess to be combined with the combination protrusion of the light dispersion member 105.

A dispersion sheet 370 may be positioned on the light dispersion member 105. The dispersion sheet 370 may disperse the light irradiated from the first face 110 of the light dispersion member 105.

A prism sheet 380 may be positioned on the dispersion sheet 370. The prism sheet 380 may improve brightness of the light irradiated from the dispersion sheet 370.

A reflection polarizing sheet 390 may be positioned on the prism sheet 380. The reflection polarizing sheet 390 may improve brightness of the light irradiated from the prism sheet 380. While a particular number of optical sheets is described, it should be understood that a variety of optical sheets, including no optical sheets, may be utilized in the backlight assembly of these embodiments.

The backlight assembly 500 includes a middle mold frame 430. The middle mold frame 430 is combined with the receiving container 320 so that the light dispersion member 105 may not substantially drift with respect to the receiving container 320. Panel guide members 440 may be positioned on corner portions of the middle mold frame 430. The panel guide members 440 may fix corners of a display panel (not shown) that is to be positioned on the middle mold frame 430. Each of the panel guide members 440 may have an L-shape. The panel guide members 440 have elasticity so that the panel guide member 440 may efficiently fix the corners of the display panel.

Figure 8:
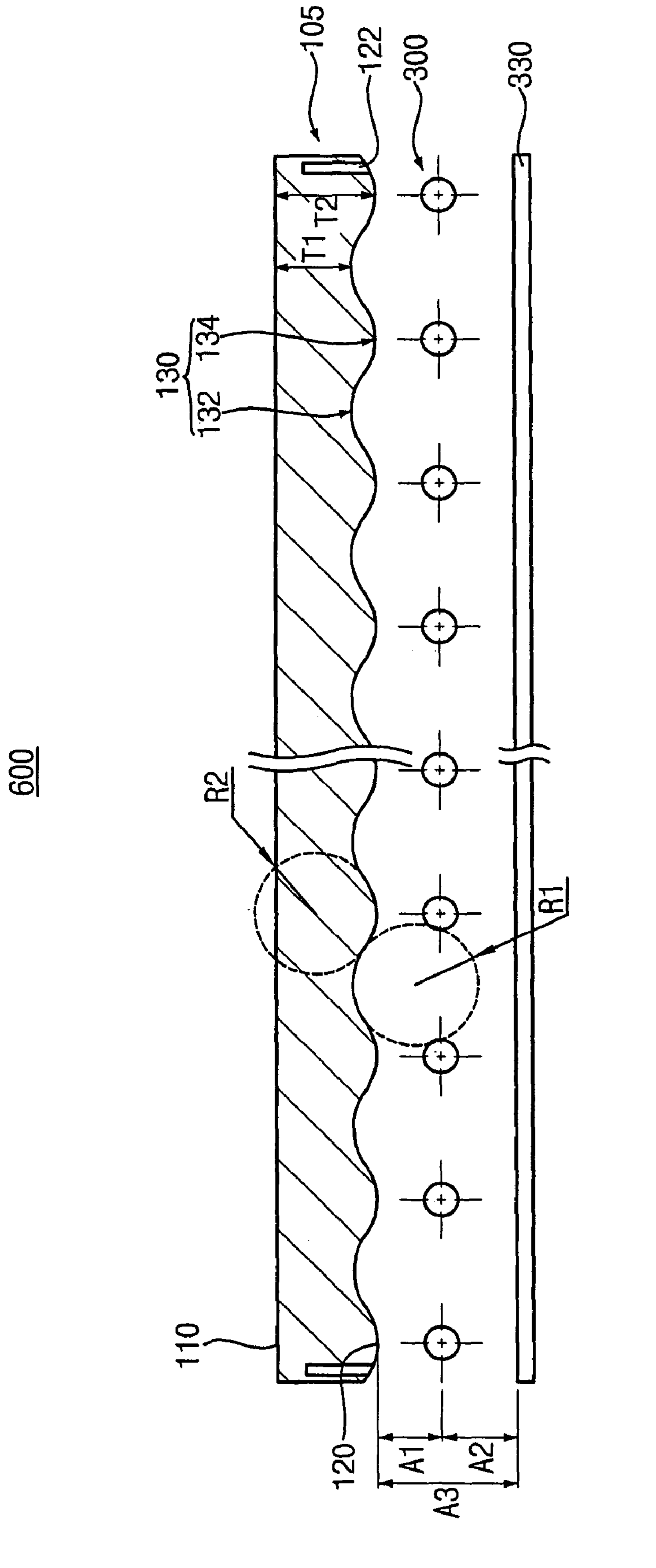
FIG. 8 is a cross-sectional view illustrating an exemplary embodiment of a backlight assembly in accordance with the present invention.

FIG. 8 is a cross-sectional view illustrating an exemplary embodiment of a backlight assembly in accordance with the present invention.

The backlight assembly 600 in FIG. 8 is substantially the same as that illustrated in FIG. 1 except for a fixing recess 122 of a light dispersion member 105.

Thus, the same reference numerals will be used to refer to the same or like parts as those described in FIG. 1 and any repetitive explanation thereof will be omitted.

Referring to FIG. 8, ridges 134 and grooves 132 are alternately formed at a lower face portion of a light dispersion member 105. Thus, a second face 120 of the light dispersion member 105 may not be easily fixed to a part (not shown) included in a backlight assembly 600 without an aid of the fixing recess 122. The part to which the fixing recess 122 is engaged may face the second face 120 of the light dispersion member 105 of the backlight assembly 600.

At least one fixing recess 122 is formed at the second face 120 of the lower face portion of the light dispersion member 105. The fixing recess 122 may enable the light dispersion member 105 to be easily fixed to the part of the backlight assembly 600. The fixing recess 122 may be combined with a fixing protrusion (not shown) upwardly protruding from the part. Thus, the light dispersion member 105 may be firmly fixed to the part of the backlight assembly 600.

Figure 9:
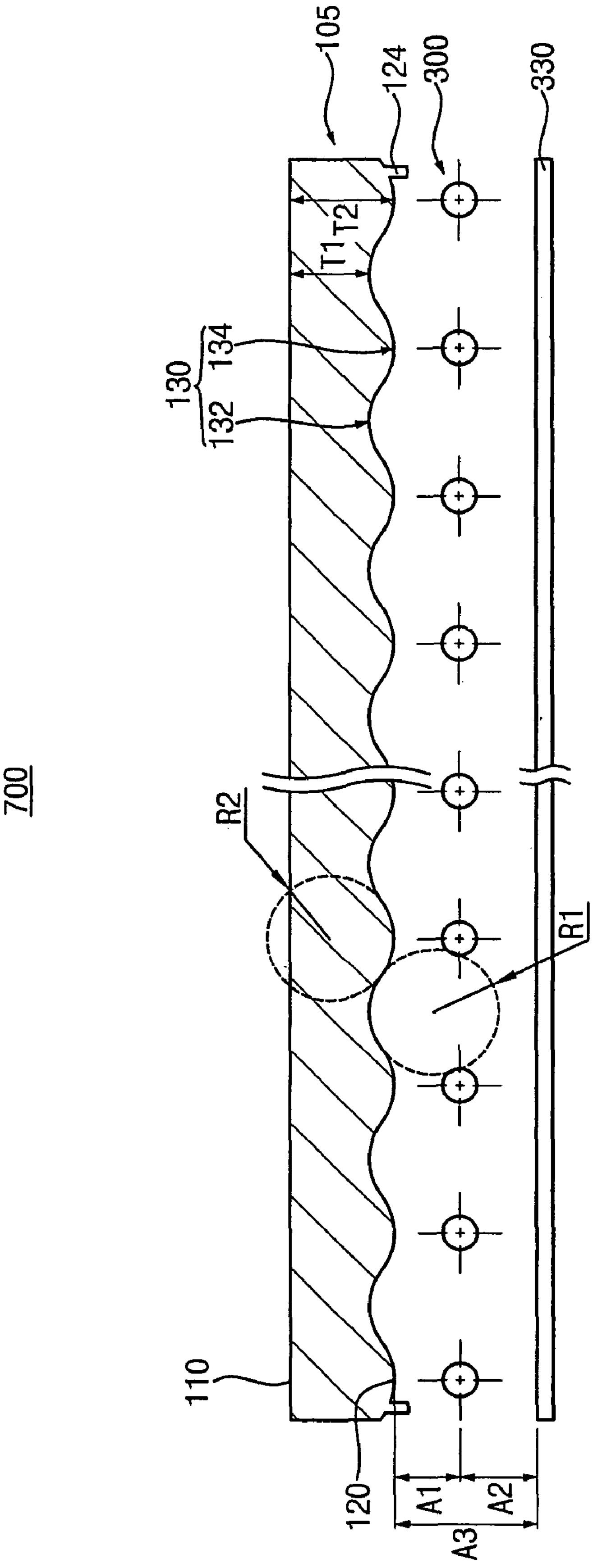
FIG. 9 is a cross-sectional view illustrating an exemplary embodiment of a backlight assembly in accordance with the present invention.

FIG. 9 is a cross-sectional view illustrating an exemplary embodiment of a backlight assembly in accordance with the present invention.

The backlight assembly 700 in FIG. 9 is substantially the same as that illustrated in FIG. 1 except for a fixing protrusion 124 of a light dispersion member 105. Thus, the same reference numerals will be used to refer to the same or like parts as those described in FIG. 1 and any repetitive explanation thereof will be omitted.

Referring to FIG. 9, ridges 134 and grooves 132 are alternately formed at a lower portion of a light dispersion member 105. Thus, a second face 120 of the light dispersion member 105 may not be easily fixed to a part (not shown) of a backlight assembly 700 without an aid of the fixing protrusion 124. The part to which the fixing protrusion 124 is engaged may face the second face 120 of the lower face portion of the light dispersion member 105.

At least one fixing protrusion 124 downwardly protrudes from the second face 120 of the light dispersion member 105. The fixing protrusion 124 may enable the light dispersion member 105 to be easily fixed to the part included in the backlight assembly 700. The fixing protrusion 124 may be combined with a fixing recess (not shown) formed at an upper face portion of the part included in the backlight assembly 700. Thus, the light dispersion member 105 may be firmly fixed to the part included in the backlight assembly 700. Thus, this embodiment is similar to the previous embodiment illustrated in FIG. 8, except that the part includes a fixing recess instead of a fixing protrusion, and the fixing recess 122 on the light dispersion member 105 in FIG. 8 is replaced by a fixing protrusion 124.

Figure 10:
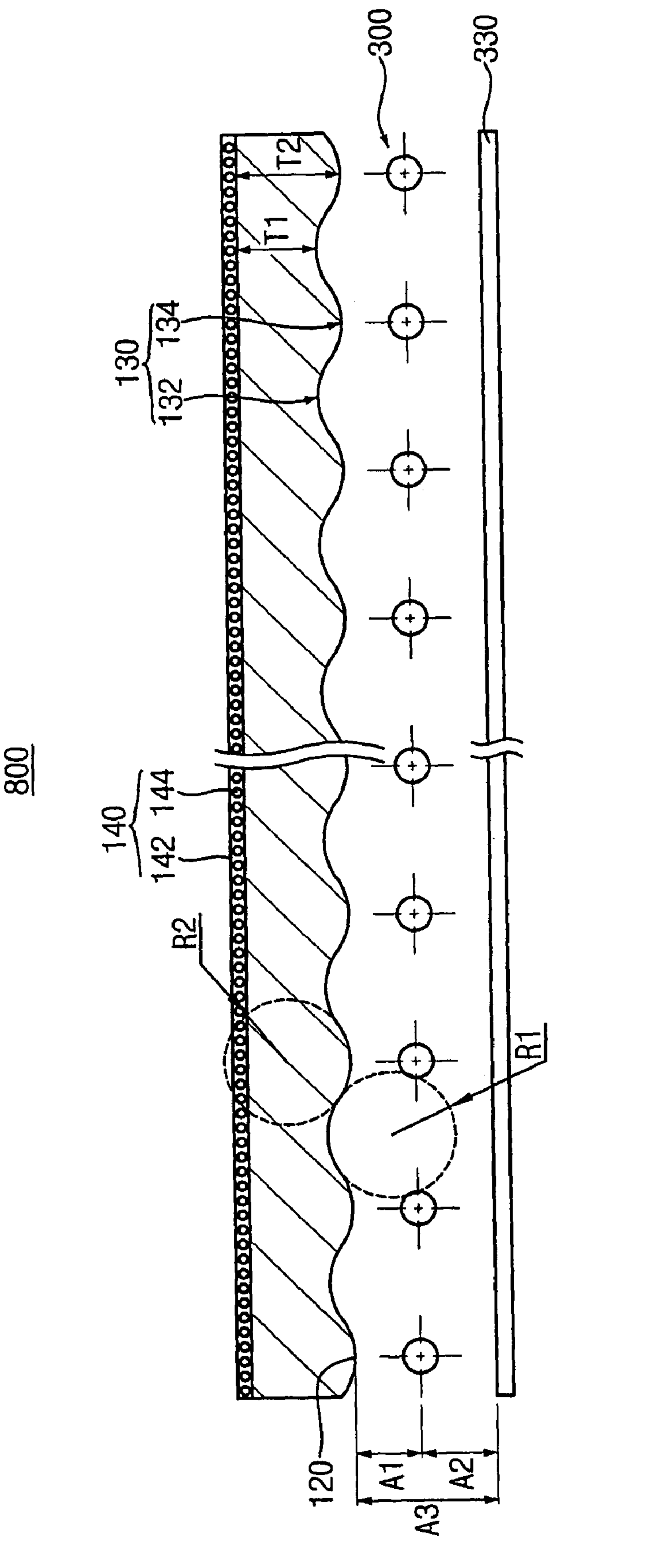
FIG. 10 is a cross-sectional view illustrating an exemplary embodiment of a backlight assembly in accordance with the present invention.

FIG. 10 is a cross-sectional view illustrating an exemplary embodiment of a backlight assembly in accordance with the present invention.

The backlight assembly 800 in FIG. 10 is substantially the same as that already illustrated in FIG. 1 except for a light dispersion layer 140 including a binder 142 and a light dispersion bead 144. Thus, the same reference numerals will be used to refer to the same or like parts as those described in FIG. 1 and any repetitive explanation thereof will be omitted.

Referring to FIG. 10, the light dispersion layer 140 is formed on a first face 110 of a light dispersion plate 105. The light dispersion layer 140 includes the binder 142 and the light dispersion bead 144.

The binder 142 has a first light refractive index. The binder 142 fixes the light dispersion bead 144 to the first face 110 of the light dispersion member 105. The binder 142 may include polyethylene terephthalate ("PET").

The light dispersion bead 144 has a second light refractive index. The light dispersion bead 144 is fixed to the first face 110 of the light dispersion plate 105 by the binder 142. The light dispersion bead 144 may have a sphere shape, although other shapes are within the scope of these embodiments. The light dispersion bead 144 may include polymethylmethacrylate ("PMMA"). As illustrated, there may be a plurality of the light dispersion beads 144 fixed to the first face 110 of the light dispersion plate 105 by the binder 142.

A light irradiated from the first face 110 of the light dispersion member 105 is incident on the light dispersion layer 140 including the binder 142 and the light dispersion bead 144. The light is then dispersed in the light dispersion layer 140 including the binder 142 and the light dispersion bead 144. Thus, brightness and brightness uniformity may be improved.

Figure 11:
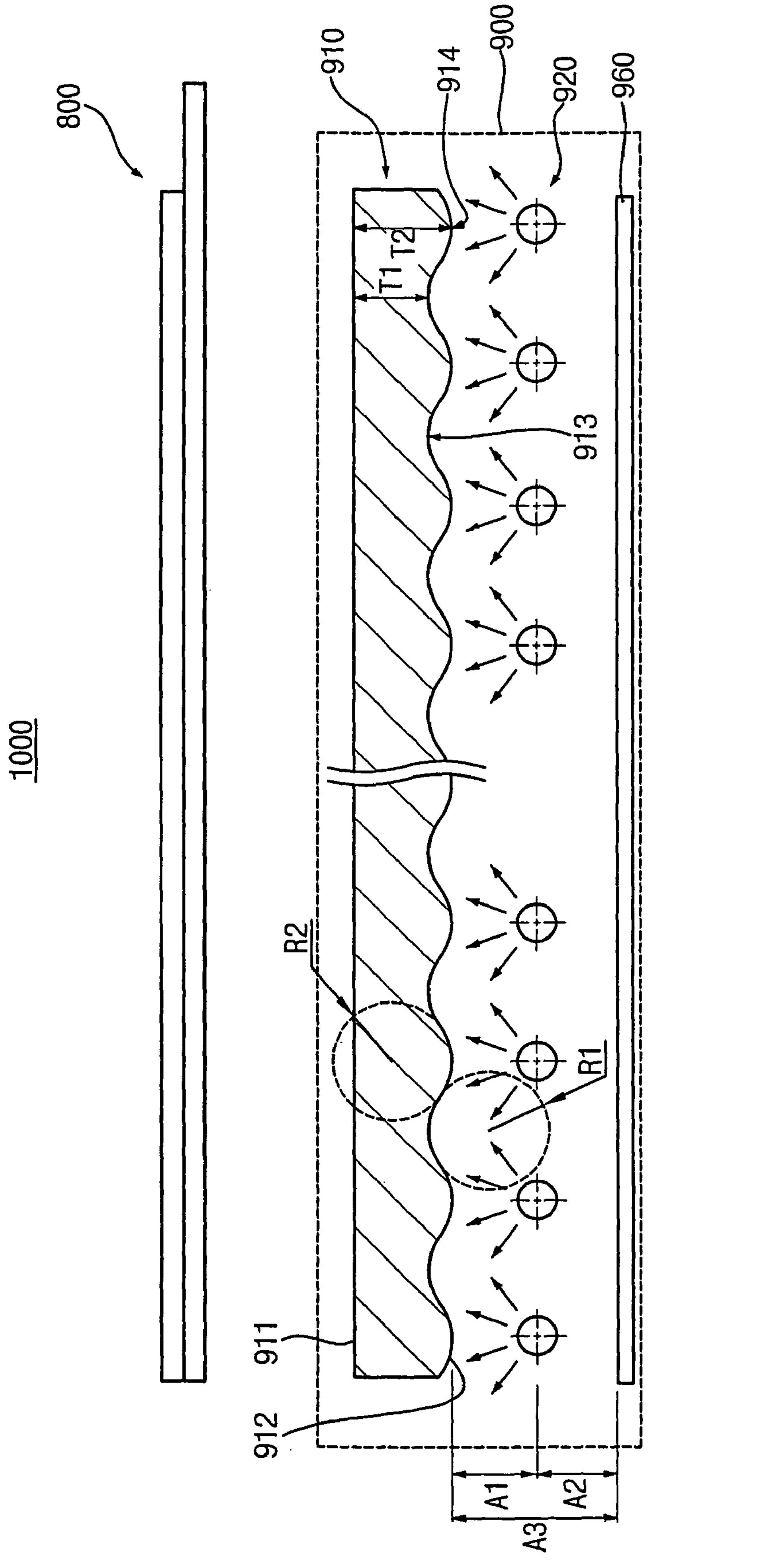
FIG. 11 is a cross-sectional view illustrating an exemplary embodiment of a display device in accordance with the present invention.
Figure 12:
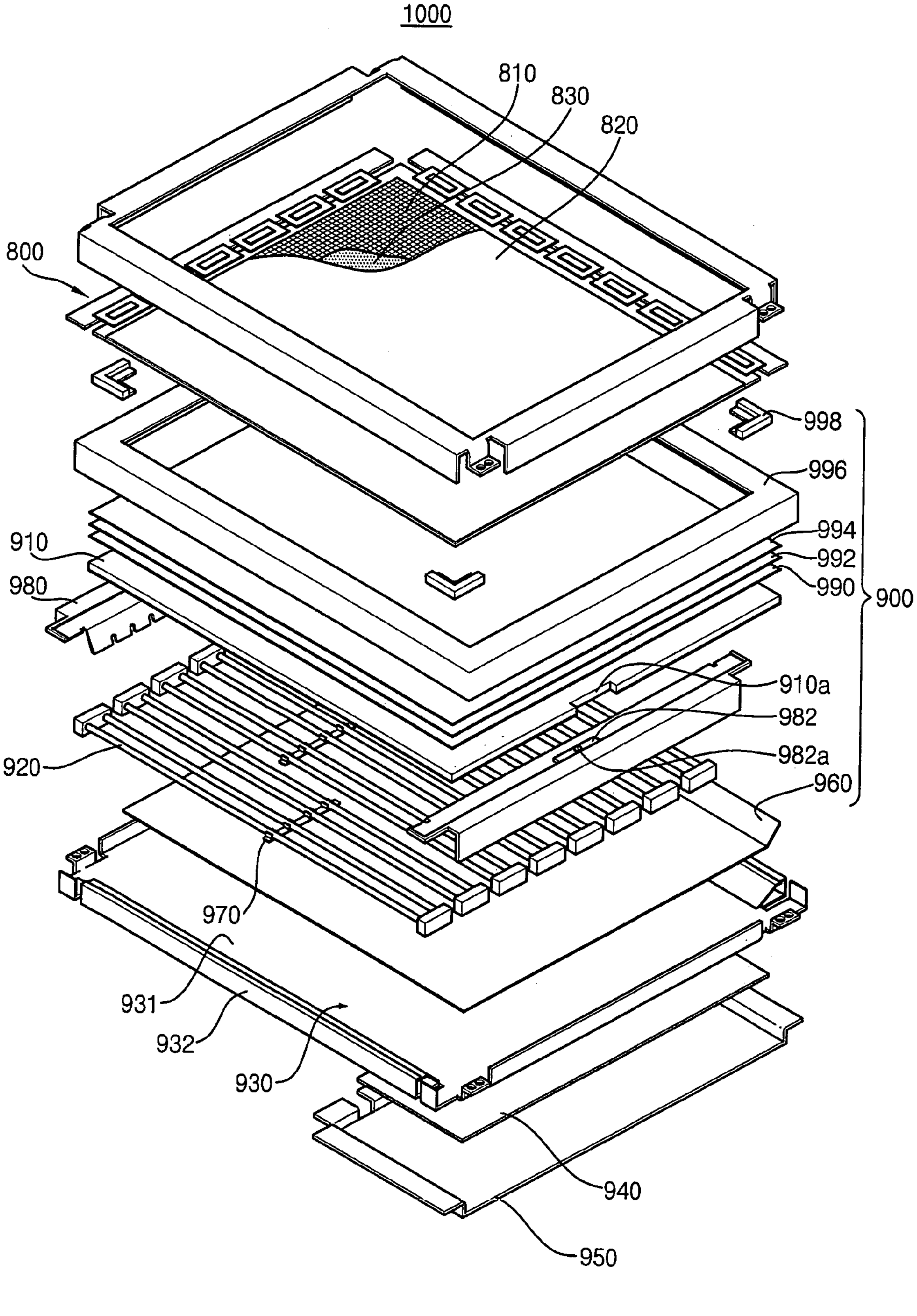
FIG. 12 is an exploded perspective view of the exemplary display device in FIG. 11.

FIG. 11 is a cross-sectional view illustrating an exemplary embodiment of a display device in accordance with the present invention. FIG. 12 is an exploded perspective view of the display device in FIG. 11.

Referring to FIG. 11, a display device 1000 includes a backlight assembly 900 and a display panel 800.

The backlight assembly 900 includes a light dispersion member 910 and a light source 920. The light source 920 provides the light dispersion member 910 with light.

The light dispersion member 910 is positioned over the light source 920. The light dispersion member 910 disperses the light irradiated from the light source 920. The light dispersion member 910 includes a first face 911 and a second face 912. The light generated from the light source 920 is incident on the second face 912 of the light dispersion member 910. The light is then irradiated from the first face 911 of the light dispersion member 910. The first face 911 is opposite to the second face 912. The second face 912 faces the light source 920.

The first face 911 of the light dispersion member 910 may be substantially even, such as by having a planar face. On the other hand, at least one groove 913 and at least one ridge 914 are formed at a lower portion of the light dispersion member 910 so that the second face 912 of the light dispersion member 910 may be substantially uneven by having a non-planar face. The grooves 913 and the ridges 914 are alternately formed at the second face 912 of a lower portion of the light dispersion member 910. That is, the groove 913 is connected between the ridges 914 that are adjacent to each other. Likewise, the ridge 914 is connected between the grooves 913 that are adjacent to each other. The ridge 914 may have a semicircular cylindrical shape, such as an arc or curved shape, although other shapes are within the scope of these embodiments.

Because the second face 912 of the light dispersion member 910 is substantially uneven, brightness and brightness uniformity of the light irradiated from the first face 912 of the light dispersion member 910 may be improved.

The groove 913 has a first radius of curvature R1. The first radius of curvature R1 may be from about 0.5 mm to about 1 mm.

The ridge 914 connected between the grooves 913 that are adjacent to each other has a second radius of curvature R2. The second radius of curvature R2 may be from about 0.5 mm to about 1 mm.

In order to improve the brightness and the brightness uniformity of the light irradiated from the first face 911 of the light dispersion member 910, a first thickness T1 and a second thickness T2 are precisely controlled. The first thickness T1 is vertically measured at a first portion of the light dispersion member 910, the first portion where the groove 913 is formed. The second thickness T2 is vertically measured at a second portion of the light dispersion member 910, the second portion where the ridge 914 is formed. In other words, the first and second thicknesses T1 and T2 are measured perpendicularly from the first face 911 to a point on the second face 912 where the light dispersion member 910 is thinnest for first thickness T1 and thickest for second thickness T1.

In order to improve the brightness and the brightness uniformity of the light irradiated from the first face 911 of the light dispersion member 910, the second thickness T2 is from about 1.15 to about 1.80 times the first thickness T1. As another example, the second thickness T2 is from about 1.15 to about 1.35 times the first thickness T1. As still another example, the second thickness T2 is from about 1.35 to about 1.67 times the first thickness T1. As still another example, the second thickness T2 is from about 1.5 to about 1.67 times the first thickness T1. As still another example, the second thickness T2 is from about 1.67 to about 1.75 times the first thickness T1. As still another example, the second thickness T2 is about 1.67 times the first thickness T1. The variations in thicknesses between T2 and T1 affect the brightness of the backlight assembly, as previously described with respect to FIG. 4.

In addition, in order to improve the brightness and the brightness uniformity of the light irradiated from the first face 911 of the light dispersion member 910, a first interval A1 between the ridge 914 and a central axis of the light source 920 may be from about 0.2 to about 0.55 times a distance D. Here, the distance D horizontally is measured between the light sources 920 that are adjacent to each other. Preferably, the first interval A1 is from about 0.2 to about 0.55 times the distance D. More preferably, the first interval A1 is from about 0.286 to about 0.51 times the distance D.

In some exemplary embodiments of the backlight assembly 900, the first interval A1 may be from about 7.0 mm to about 12.5 mm. The distance D between the light sources 920 that are adjacent to each other may be from about 3.75 mm to about 43.7 mm.

In addition, in order to improve the brightness and the brightness uniformity of the light irradiated from the first face 911 of the light dispersion member 910, a second interval A2 is from about 0.10 to about 0.25 times the distance D. Here, the second interval A2 is vertically measured between the central axis of the light source 920 and a reflection plate 960 that is positioned under the light source 920. Preferably, the second interval A2 is from 0.139 to about 0.212 times the distance D.

In detail, the second interval A2 may be from about 3.1 mm to about 5.4 mm.

The light source 920 may have a U-shape or a C-shape. The light source 920 may be an external internal electrode fluorescent lamp ("EIEFL"). Alternatively, the light source 920 is an external electrode fluorescent lamp ("EEFL").

Each lamp in the light source 920 is positioned directly under one of the ridges 914 of the light dispersion member 910.

The display panel 800 faces the first face 911 of the light dispersion member 910. The display panel 800 may display an image by using the light irradiated from the first face 911 of the light dispersion member 910.

Referring to FIG. 12, the light dispersion member 910 and the light sources 920 are received in a receiving container 930.

The receiving container 930 includes a bottom plate 931 and a sidewall 932. The bottom plate 931 may be generally rectangular, although other shapes are within the scope of these embodiments. The sidewall 932 upwardly extends from a peripheral edge of the bottom plate 931. The bottom plate 931 and the sidewall 932 together define a receiving recess in which the light dispersion member 910 and the light sources 920 are received.

The backlight assembly 900 may further include an inverter 940. The inverter 940 may be positioned beneath a lower surface of the bottom plate 931 of the receiving container 930. The inverter 940 provides the light source 920 with a drive power enabling the light source 920 to generate the light.

The receiving container 930 may further include a shield case 950 covering the inverter 940 therewith. The shield case 950 may block a harmful microwave generated from the inverter 940. The shield case 950 may be combined with the bottom plate 931 of the receiving container 930.

A light source supporter 970 fixes the light sources 920 to the receiving container 930. Alternatively, the light source supporter 970 fixes the light sources 920 to the reflection plate 960 fixed to the receiving container 930.

A mold frame 980 covering end portions of the light sources 920 is positioned between the end portions of the light sources 920 and the light dispersion member 910. The mold frame 980 supports the light dispersion member 910 thereon.

A combination recess 910*a* is formed at a sidewall portion of the light dispersion member 910. A combination protrusion 982 upwardly protrudes from the mold frame 980. The combination recess 910*a* of the light dispersion member 910 corresponds to the combination protrusion 982 of the mold frame 980. The combination recess 910*a* of the light dispersion member 910 is combined with the combination protrusion 982 of the mold frame 980 so that the light dispersion member 910 may not substantially drift with respect to the mold frame 980.

Alternatively, the light dispersion member 910 includes a combination protrusion (not shown) downwardly protruding from a sidewall portion thereof. In such an alternative embodiment, the mold frame 980 includes a combination recess combined with the combination protrusion of the light dispersion member 910.

A dispersion sheet 990 may be positioned on the light dispersion member 910. The dispersion sheet 990 may disperse the light irradiated from the first face 911 of the light dispersion member 910. A prism sheet 992 may be positioned on the dispersion sheet 990. The prism sheet 992 may improve brightness of the light irradiated from the dispersion sheet 990. A reflection polarizing sheet 994 may be positioned on the prism sheet 992. The reflection polarizing sheet 994 may improve brightness of the light irradiated from the prism sheet 992. Although a particular number and variety of optical sheets has been described, it should be understood that an alternate number of optical sheets and types of optical sheets may be included in the backlight assembly 900.

An ancillary protrusion 982*a* upwardly protrudes from the combination protrusion 982. The ancillary protrusion 982*a* may fix the dispersion sheet 990, the prism sheet 992, and the reflection polarizing sheet 994. The dispersion sheet 990, prism sheet 992, and reflection polarizing sheet 994 may each include an aperture for receiving the ancillary protrusion 982*a*.

The backlight assembly 900 may include a middle mold frame 996. The middle mold frame 996 may be combined with the receiving container 930 so that the light dispersion member 910 may not substantially drift with respect to the receiving container 930. Panel guide members 998 are formed on the middle mold frame 996. The panel guide members 998 may fix corners of the display panel 800. Each of the panel guide members 998 has elasticity so that the panel guide members 998 may efficiently fix the corners of the display panel 800.

The display panel 800 may be positioned on the middle mold frame 996. The display panel 800 may be fixed to the middle mold frame 996 and relative to the backlight assembly 900 by the panel guide members 998.

The display panel 800 may include a thin film transistor ("TFT") substrate 810, a color filter substrate 820, and a liquid crystal ("LC") layer 830.

The TFT substrate 810 includes pixel electrodes (not shown) and TFTs (not shown). The pixel electrodes are arranged in a matrix shape. The TFTs are electrically connected to the pixel electrodes so that the TFTs may provide the pixel electrodes with a drive voltage. The pixel electrodes may include indium tin oxide ("ITO"), indium zinc oxide ("IZO"), or amorphous indium tin oxide ("a-ITO"). These may be used alone or in a mixture thereof.

The color filter substrate 820 faces the TFT substrate 810. The color filter substrate 820 includes a common electrode (not shown) facing the pixel electrodes. The common electrode may continuously cover the color filter substrate 820 therewith. The common electrode may include ITO, IZO or a-ITO. These may be used alone or in a mixture thereof.

The LC layer 830 is positioned between the TFT substrate 810 and the color filter substrate 820. The LC layer 830 includes LC molecules (not shown) arranged in accordance with an electrical field applied thereto. In case that an arrangement of the LC molecules varies, a light transmissivity of the LC layer 830 may vary.

Figure 13:
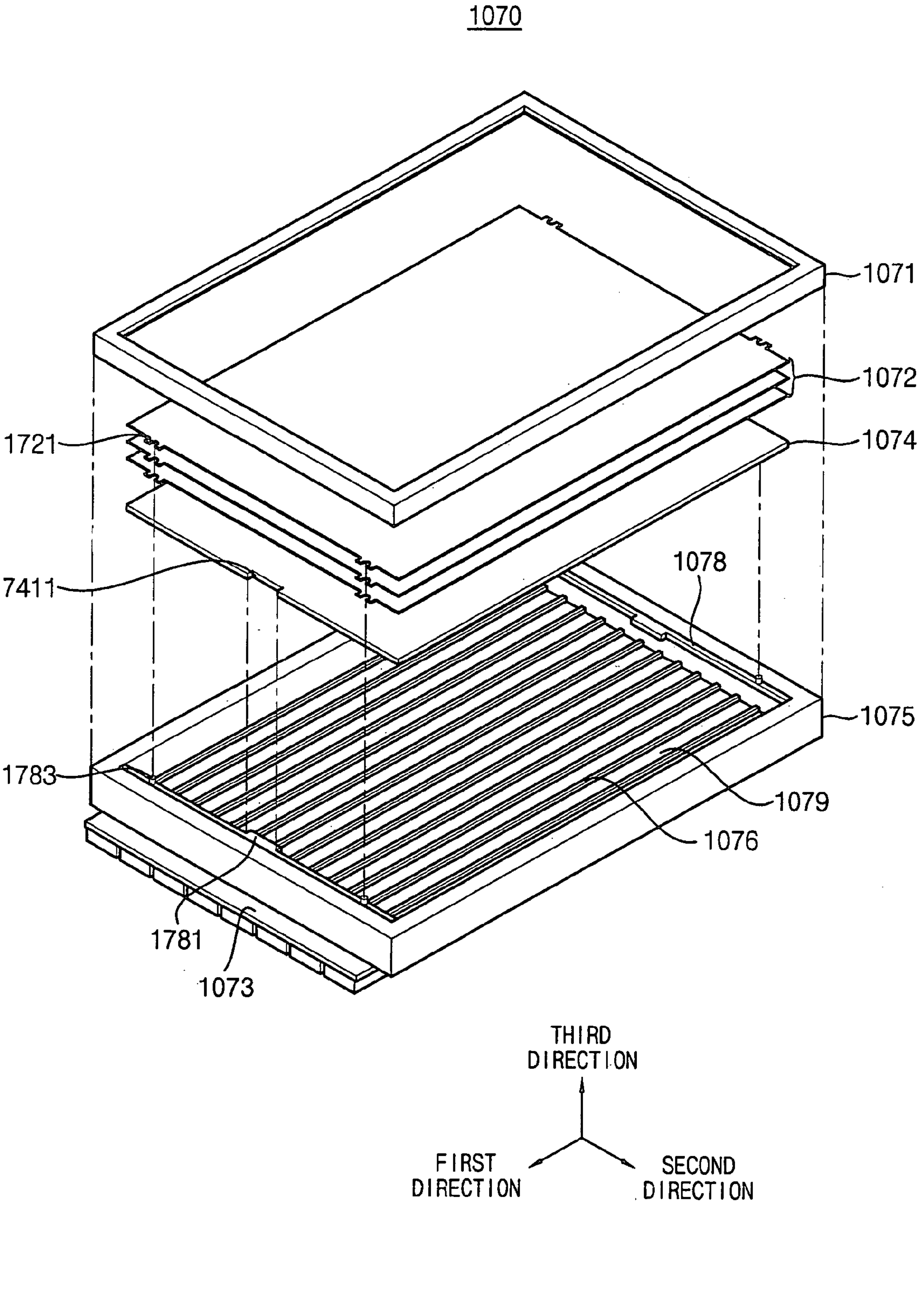
FIG. 13 is an exploded perspective view illustrating an exemplary embodiment of a backlight assembly in accordance with the present invention.

FIG. 13 is an exploded perspective view illustrating an exemplary embodiment of a backlight assembly in accordance with the present invention.

A backlight assembly 1070 is a direct illumination type backlight assembly having light sources 1076 that extend in a first direction. The light sources 1076 are substantially in parallel with each other. The light sources 1076 are spaced apart from each other by a predetermined interval. The backlight assembly 1070 may be used in a large screen LCD device such as an LCD TV.

The backlight assembly 1070 includes an uneven dispersion plate 1074, the light source 1076, and a frame mold side 1078. The uneven dispersion plate 1074 may disperse a light irradiated from the light source 1076 and then emit the light in a third direction. A bottom chassis 1075 is positioned at a lower portion of the backlight assembly 1070. The bottom chassis 1075 receives the light source 1076, a light source holder 1077 (see FIG. 17), the frame mold side 1078 and a reflection sheet 1079. A mold frame 1071 is positioned at an upper portion of the backlight assembly 1070. The mold frame 1071 is combined with the bottom chassis 1075.

As illustrated in FIG. 13, the light source 1076 is a lamp such as a CCFL. However, many apparent variations of the light source 1076 are possible. By example only, the light source 1076 is a light emitting diode ("LED").

Figure 17:
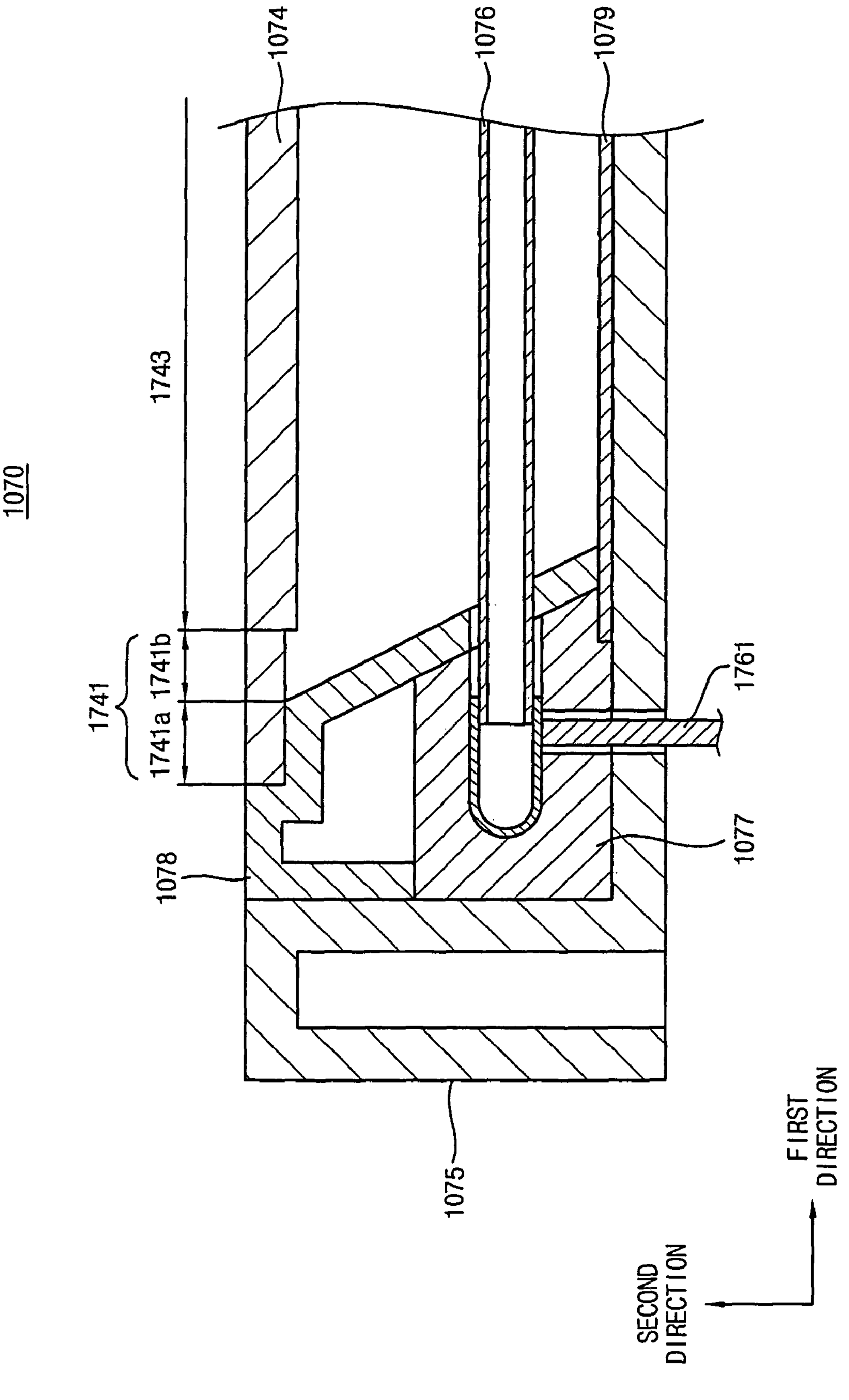
FIG. 17 is a cross-sectional view taken along line II-II' in FIG. 15.

The light source 1076 that generates the light may be fixed to the bottom chassis 1075 by a light source holder 1077 (FIG. 17). The reflection sheet 1079 is positioned between the light source 1076 and the bottom chassis 1075. The reflection sheet 1079 may reflect the light incident thereon toward the uneven dispersion plate 1074. When the light generated from the light source 1076 passes through the uneven dispersion plate 1074, the light may be dispersed. Thus, brightness of the light irradiated from the uneven dispersion plate 1074 may be improved.

As described above, the light source 1076 may be the CCFL. Alternatively, the light source 1076 may be an EEFL. The light source holder 1077 (FIG. 17) covers an end portion of the light source 1076. The light source 1076 may be fixed to the light source holder 1077. The frame mold side 1078 may cover the light source holders 1077 so that the light source holders 1077 may be fixed to the frame mold side 1078. An inverter 1073 is positioned beneath the bottom chassis 1075. The inverter 1073 may be a type of printed circuit board ("PCB"). The inverter 1073 may provide an external power having a predetermined voltage level to the light source 1076. The external power may enable the light source 1076 to generate the light. Awire 1761 (FIG. 14 and FIG. 17) and a socket 1763 (FIG. 14) connected to the wire 1761 may electrically connect the light source 1076 to the inverter 1073.

The uneven dispersion plate 1074 has a concave (indented) portion 7411 at a sidewall thereof. The concave portion 7411 is combinable with a convex (protruded) portion 1781 of the frame mold side 1078. The uneven dispersion plate 1074 may include PMMA. A preliminary uneven dispersion plate is formed by, for example, an injection molding process. Acutting process may then be performed on the preliminary uneven dispersion plate to form the uneven dispersion plate 1074 having the concave portion 7411 at the sidewall thereof. Many apparent variations of shapes and positions of the concave portion 7411 are possible.

Figure 14:
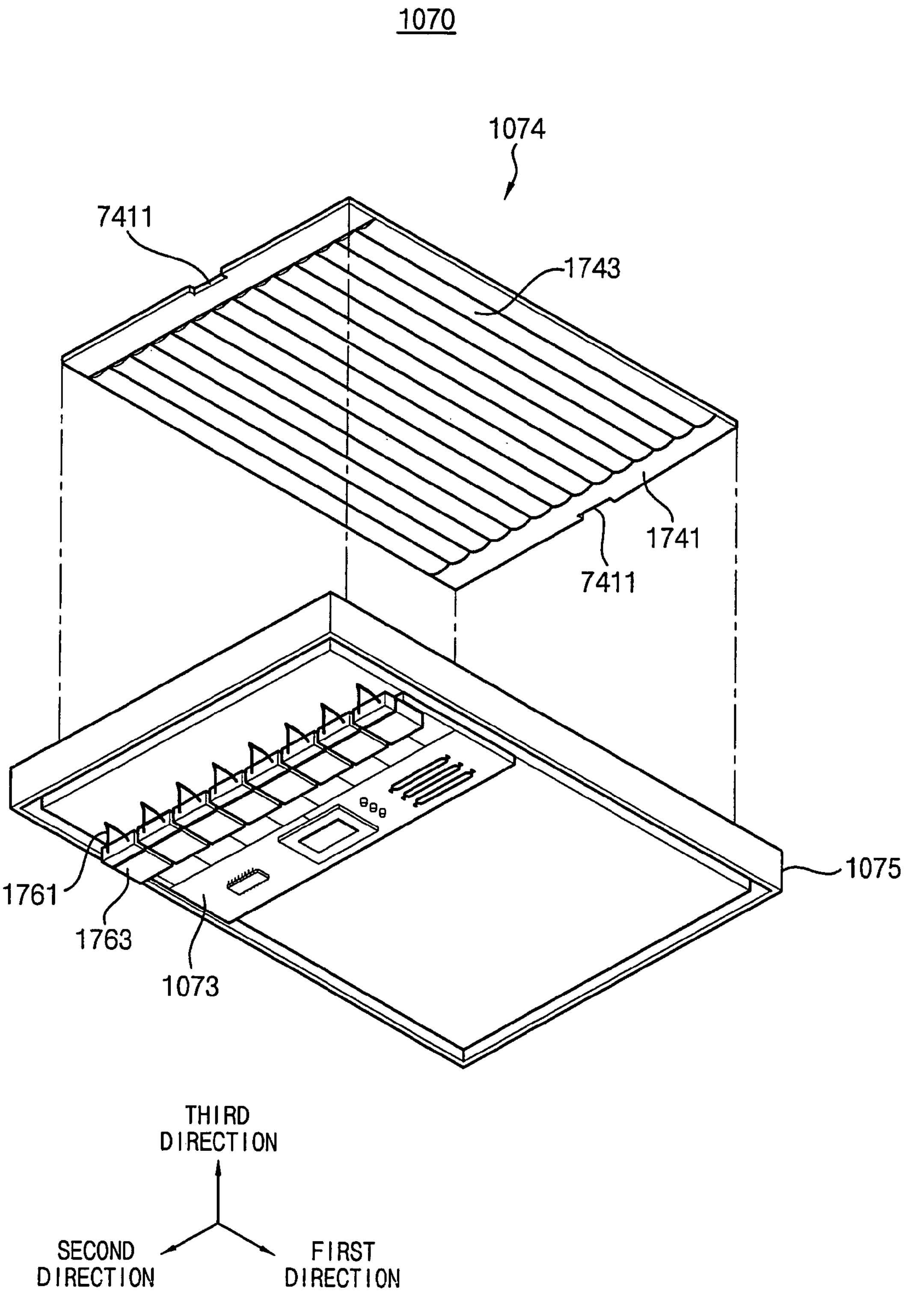
FIG. 14 is a partially exploded perspective view illustrating a rear portion of the exemplary backlight assembly in FIG. 13.

As illustrated in FIG. 14, the number of the concave portions 7411 is two. However, many apparent variations of the number of the concave portions 7411 are possible. For example, the opposite sides of the uneven dispersion plate 1074 that are supported by the frame mold sides 1078 may each include more than one concave portion 7411.

Alternatively, the uneven dispersion plate 1074 has a convex portion (not shown). The convex portion would be combined with a concave portion (not shown) of the frame mold side 1078.

As illustrated in FIG. 13, the frame mold side 1078 receives the uneven dispersion plate 1074. However, the bottom chassis 1075 may receive the uneven dispersion plate 1074 instead of the frame mold side 1078.

At least one optical sheet 1072 is positioned on the uneven dispersion plate 1074. The optical sheets 1072 have fixing portions 1721 at sidewalls thereof. Each fixing portion 1721 is to be combined with a boss 1783. The boss 1783 upwardly protrudes from the frame mold side 1078. Alternatively, the boss 1783 upwardly protrudes from the bottom chassis 1075 instead of the frame mold side 1078.

FIG. 14 is a partially exploded perspective view illustrating a rear portion of the exemplary backlight assembly in FIG. 13. The optical sheets 1072 and the mold frame 1071 shown in FIG. 13 are not illustrated in FIG. 14 for clarity.

A plurality of ridges within a ridge portion 1743 is formed at a lower face portion of the uneven dispersion plate 1074. The lower face portion of the uneven dispersion plate 1074 faces the light source 1076 (FIG. 13). The ridges in the ridge portion 1743 extend in the first direction in which the light source 1076 extends. The ridges in the ridge portion 1743 may each directly correspond to a light source 1076 so that a bright line of the light source 1076 may be suppressed. Thus, the brightness and the brightness uniformity of the light irradiated from the uneven dispersion plate 1074 may be improved.

A contact portion 1741 of the uneven dispersion plate 1074 is supported on the frame mold side 1078 and is substantially even, e.g. substantially planar or having planar faces. The contact portion 1741 extends in a second direction substantially perpendicular to the first direction. The contact portion 1741 is positioned at a side portion of the uneven dispersion plate 1074. Because the contact portion 1741 is substantially even, the contact portion 1741 may be efficiently supported on the frame mold side 1078.

Figure 15:
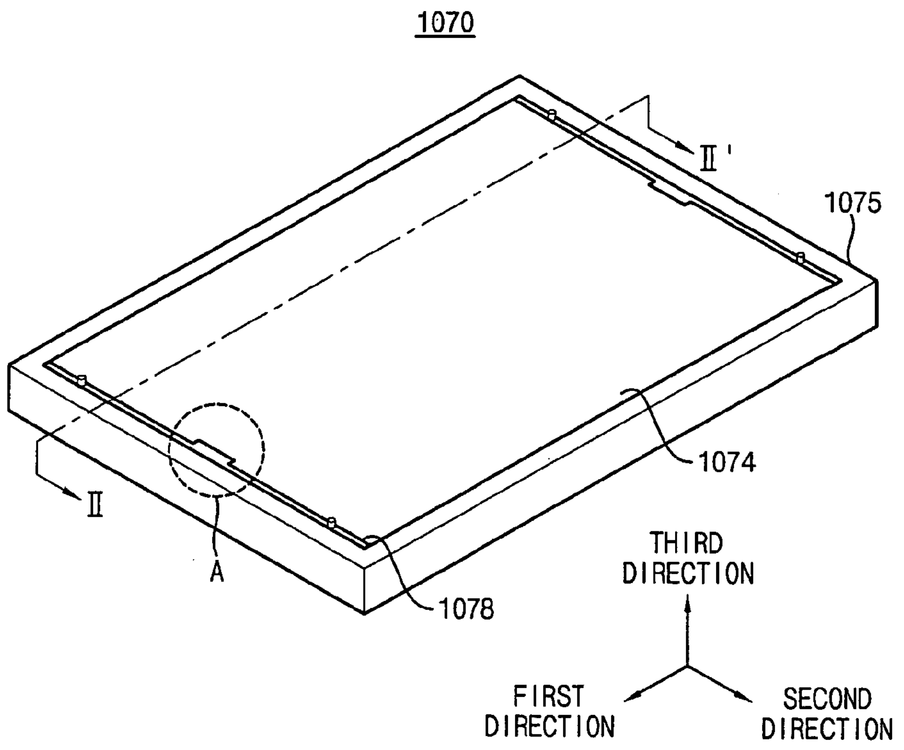
FIG. 15 is a perspective view illustrating a combination of an exemplary uneven dispersion plate and an exemplary bottom chassis that are illustrated in FIG. 14.

FIG. 15 is a perspective view illustrating a combination of the exemplary uneven dispersion plate and the exemplary bottom chassis that are illustrated in FIG. 14.

Referring to FIG. 15, the frame mold side 1078 receives the uneven dispersion plate 1074. The frame mold side 1078 extends in the second direction along a side portion of the uneven dispersion plate 1074. The light source 1076 received in the backlight assembly 1070 extends in the first direction, substantially perpendicular to the second direction.

Figure 16:
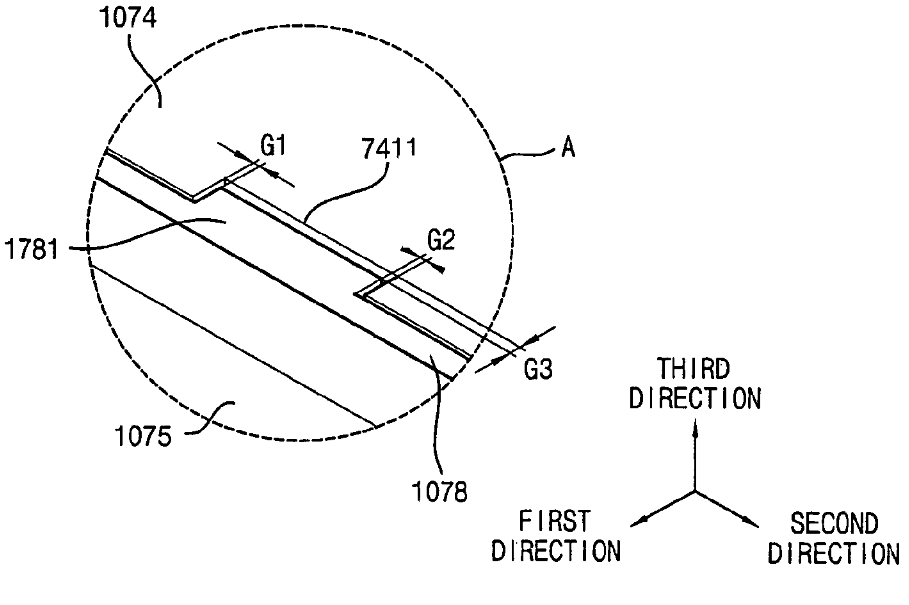
FIG. 16 is an enlarged view illustrating portion "A" in FIG. 15.

FIG. 16 is an enlarged view illustrating portion "A" in FIG. 15.

Referring to FIG. 16, the uneven dispersion plate 1074 and the frame mold side 1078 are apart from each other. In detail, there are a first gap G1, a second gap G2, and a third gap G3 between the convex portion 1781 of the frame mold side 1078 and the concave portion 7411 of the uneven dispersion plate 1074.

Here, the first gap G1, the second gap G2, and the third gap G3 are determined with consideration of a thermal expansion of the uneven dispersion plate 1074. In addition, the first gap G1, the second gap G2, and the third gap G3 are determined with consideration of an efficient combination between the uneven dispersion plate 1074 and the frame mold side 1078.

More particularly, there are the first gap G1 and the second gap G2 between the uneven dispersion plate 1074 and the frame mold side 1078 in the second direction. Each of the first gap G1 and the second gap G2 may be no more than about 0.5 mm. It is because the uneven dispersion plate 1074 and the frame mold side 1078 are efficiently combined with each other on condition that each of the first gap G1 and the second gap G2 is no more than about 0.5 mm. On the other hand, if the first gap G1 or the second gap G2 is over about 0.5 mm, the uneven dispersion plate 1074 may unfortunately drift.

Preferably, at least one of the first gap G1 and the second gap G2 may be less than or equal to about 0.1 mm. Because the backlight assembly 1070 is generally used in a substantially upright state, the convex portion 1781 of the frame mold side 1078 may support the concave portion 7411 of the uneven dispersion plate 1074. When setting the backlight assembly 1070 in the upright state, the convex portion 1781 of the frame mold side 1078 may efficiently support the concave portion 7411 of the uneven dispersion plate 1074 on the condition that at least one of the first gap G1 and the second gap G2 may be no more than about 0.1 mm.

In addition, there is the third gap G3 between the uneven dispersion plate 1074 and the frame mold side 1078 in the first direction.

The third gap G3 may be from about 1.6 mm to about 3.2 mm. When the third gap G3 is from about 1.6 mm to about 3.2 mm, the frame mold side 1078 may be efficiently combined with the uneven dispersion plate 1074 in spite of the thermal expansion of the uneven dispersion plate 1074. The thermal expansion of the uneven dispersion plate 1074 may result from a heat generated from the light source 1076.

If the third gap G3 is no more than about 1.6 mm, a thermal expansion of the uneven dispersion plate 1074 may result in a deformation of the uneven dispersion plate 1074 because the frame mold side 1078 would contact the uneven dispersion plate 1074 and apply pressure to the uneven dispersion plate 1074.

If the third gap G3 is over about 3.2 mm, the uneven dispersion plate 1074 may drift.

FIG. 17 is a cross-sectional view taken along line II-II' in FIG. 15.

Referring to FIG. 17, the uneven dispersion plate 1074 includes the contact portion 1741 and the ridge portion 1743. A lower face of the contact portion 1741 may be substantially even, such as substantially planar as shown. The contact portion 1741 includes a first contact portion 1741*a* and a second contact portion 1741*b*. The frame mold side 1078 may mainly support the first contact portion 1741*a* thereon. The frame mold side 1078 may include a face that is parallel with the lower face of the contact portion 1741. Also, the frame mold side 1078 may include a step and a wall formed between the step and the face supporting the contact portion 1741. The wall may contact an edge of the uneven dispersion plate 1074, or prevent the uneven dispersion plate 1074 from substantial drifting between a pair of the frame mold sides 1078. The first contact portion 1741*a* and the second contact portion 1741*b* are connected to each other. The second contact portion 1741*b* is positioned between the first contact portion 1741*a* and the ridges in the ridge portion 1743 so that the frame mold side 1078 may not contact, or may barely contact, the ridge portion 1743 even if the uneven dispersion plate 1074 drifts. Thus, the frame mold side 1078 may efficiently support the uneven dispersion plate 1074 thereon.

A width of the second contact portion 1741*b*, the width being measured in the first direction, may be no more than about 1.0 mm. If the width of the second contact portion 1741*b* is over about 1.0 mm, a length of the ridge portion 1743, measured in the first direction, would be shortened. Thus, a dispersion efficiency of the uneven dispersion plate 1074 may unfortunately decrease.

According to the above, the width of the second contact portion 1741*b* is preferably no more than about 1.0 mm. Thus, the uneven dispersion plate 1074 may have a relatively high dispersion efficiency. In addition, the frame mold side 1078 may efficiently support the uneven dispersion plate 1074 with an aid of the second contact portion 1741*b* so that an endurance of the backlight assembly 1070 may be improved.

Figure 18:
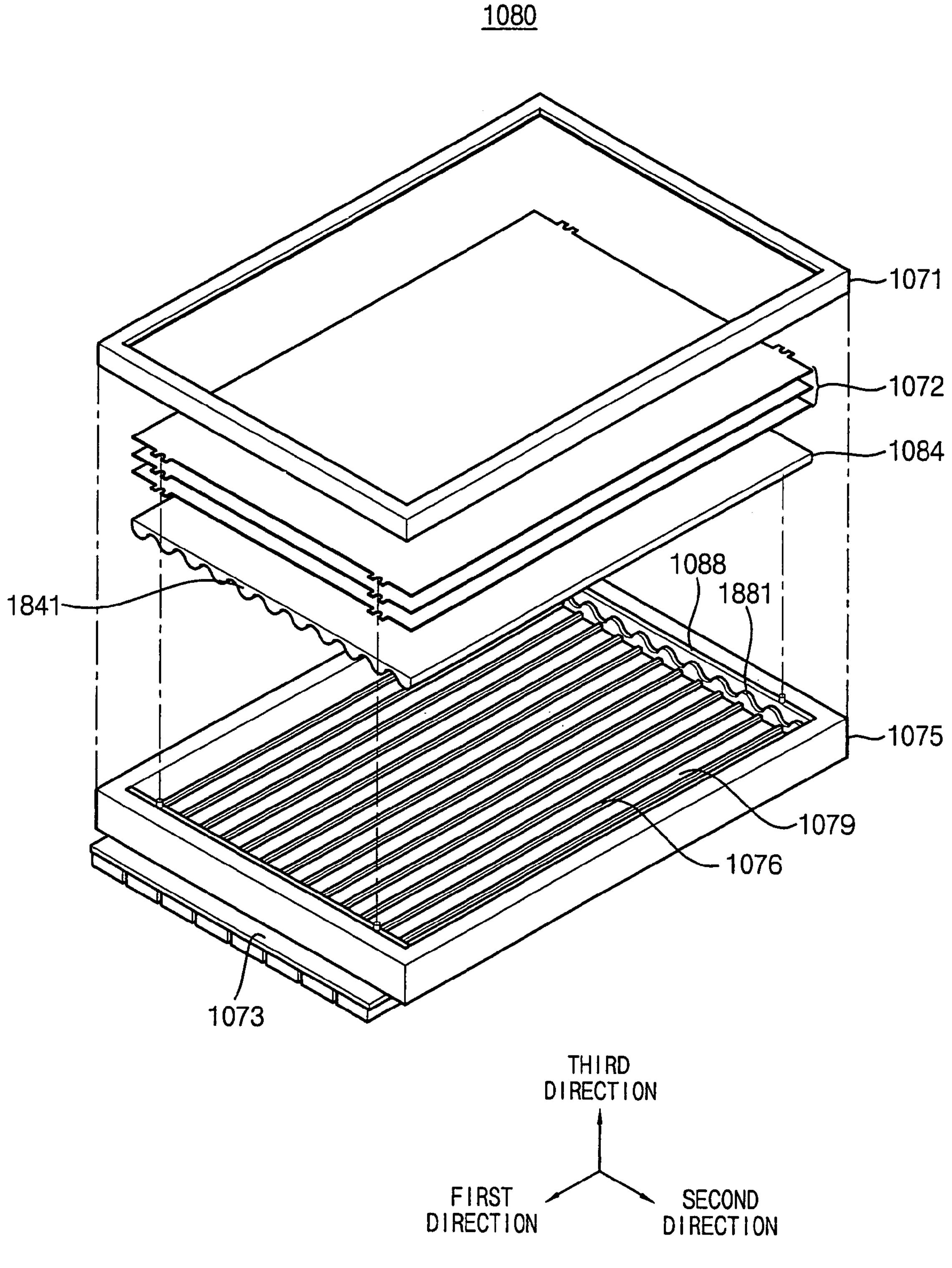
FIG. 18 is an exploded perspective view illustrating an exemplary embodiment of a backlight assembly in accordance with the present invention.

FIG. 18 is an exploded perspective view illustrating an exemplary embodiment of a backlight assembly in accordance with the present invention. In this embodiment, a frame mold side 1088 has an uneven face 1881 for receiving an uneven dispersion plate 1084 thereon.

A backlight assembly 1080 in FIG. 18 is substantially identical to that illustrated in FIG. 13 except for the uneven dispersion plate 1084 and the frame mold side 1088. Thus, the same reference numerals will be used to refer to the same or like parts as those described in FIG. 13 and any repetitive explanation thereof will be omitted.

Referring to FIG. 18, a plurality of ridges 1841 is formed beneath an entire lower face portion of the uneven dispersion plate 1084. That is, the entire lower face portion of the uneven dispersion plate 1084, the entire lower face portion facing light sources 1076 and a frame mold side 1088, are fully covered with the ridges 1841. The ridges 1841 extend in a first direction and in the same direction as the light sources 1076. The frame mold side 1088 positioned under the uneven dispersion plate 1084 has an uneven upper face 1881 facing end portions of the ridges 1841. Thus, the uneven dispersion plate 1084 may be efficiently received and firmly fixed on the uneven face 1881 of the frame mold side 1088. As a result, a bright line may not be substantially generated.

As illustrated in FIG. 18, the frame mold side 1088 receives the uneven dispersion plate 1084. In one alternative, the uneven dispersion plate 1084 is received on a bottom chassis 1075 that has an uneven upper face on which the end portions of the ridges 1841 are positioned. In another alternative, the uneven dispersion plate 1084 is received on a part (not shown) of the backlight assembly 1080, the part having an uneven upper face on which the end portions of the ridges 1841 are positioned. The part may face the uneven dispersion plate 1084.

Figure 19:
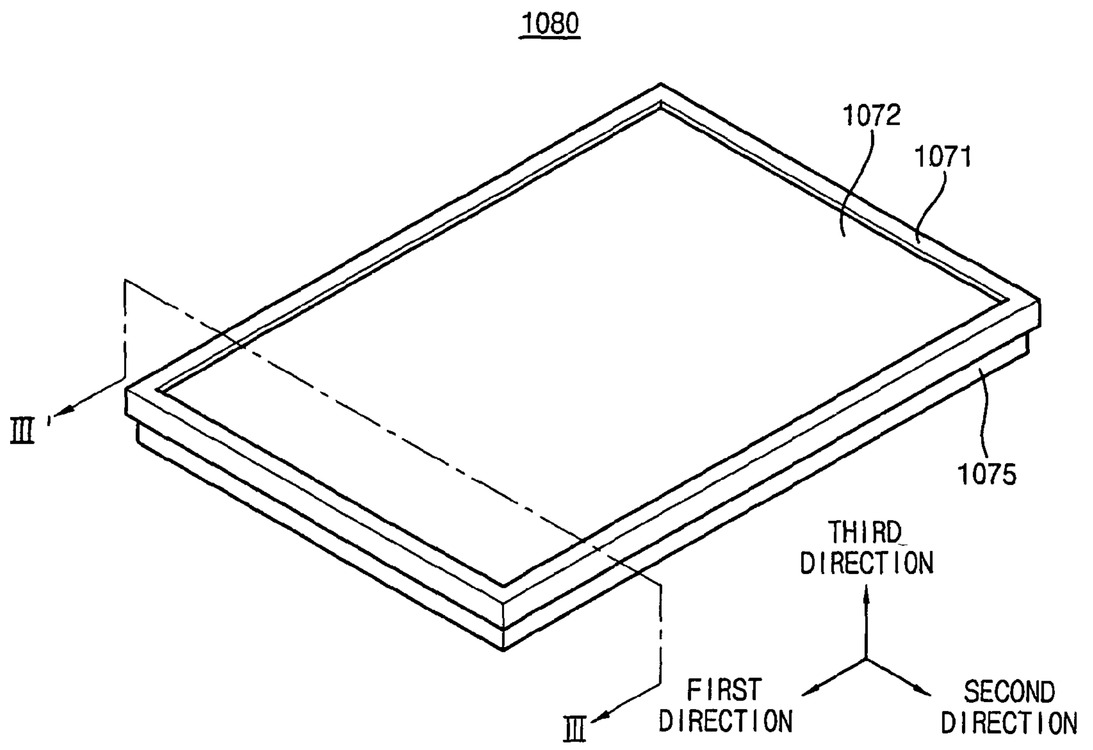
FIG. 19 is a perspective view illustrating the exemplary backlight assembly in FIG. 18.
Figure 20:
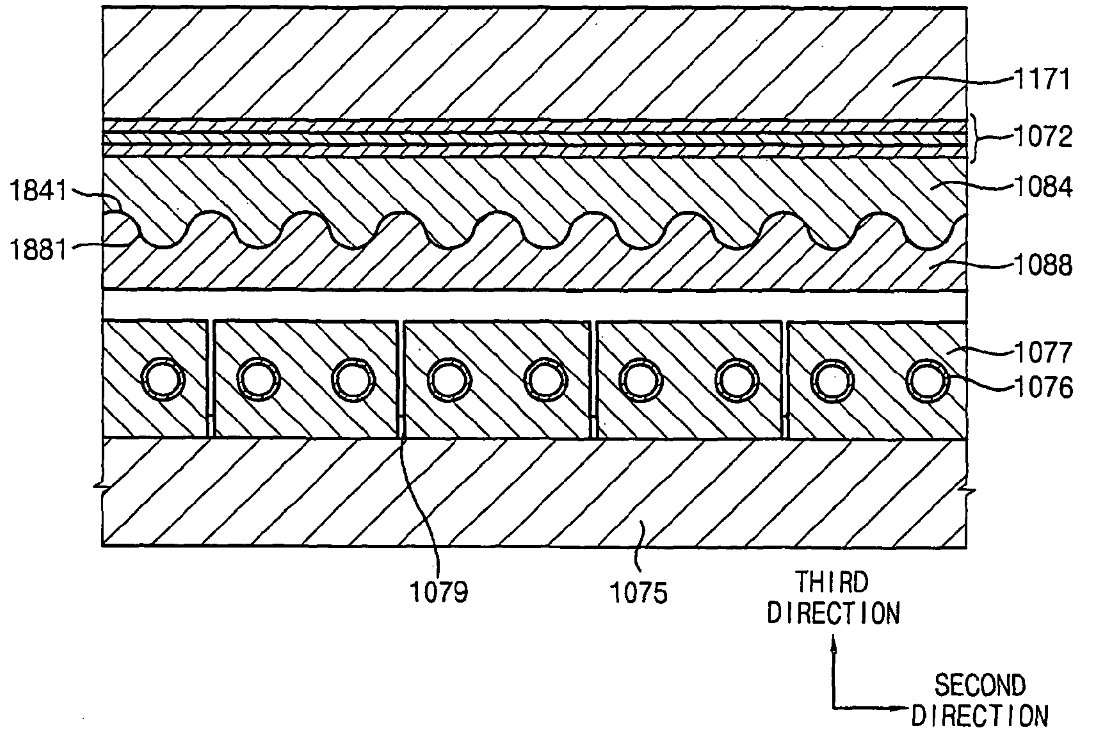
FIG. 20 is an enlarged cross-sectional view taken along line III-III' in FIG. 19.

FIG. 19 is a perspective view illustrating the exemplary backlight assembly in FIG. 18. FIG. 20 is an enlarged cross-sectional view taken along line III-III' in FIG. 19.

Referring to FIGS. 19 and 20, the ridges 1841 are positioned directly over the light sources 1076 so that the bright line generated from the light source 1076 may be suppressed.

In addition, the ridges 1841 of the uneven dispersion plate 1084 are firmly combined with the uneven face 1881 of the frame mold side 1088 so that the uneven dispersion plate 1084 may be firmly fixed relative to the frame mold side 1088. Because the uneven dispersion plate 1084 does not substantially drift with respect to the frame mold side 1088, the bright line due to an alignment error between the uneven dispersion plate 1084 and the light sources 1076 may be suppressed.

Figure 21:
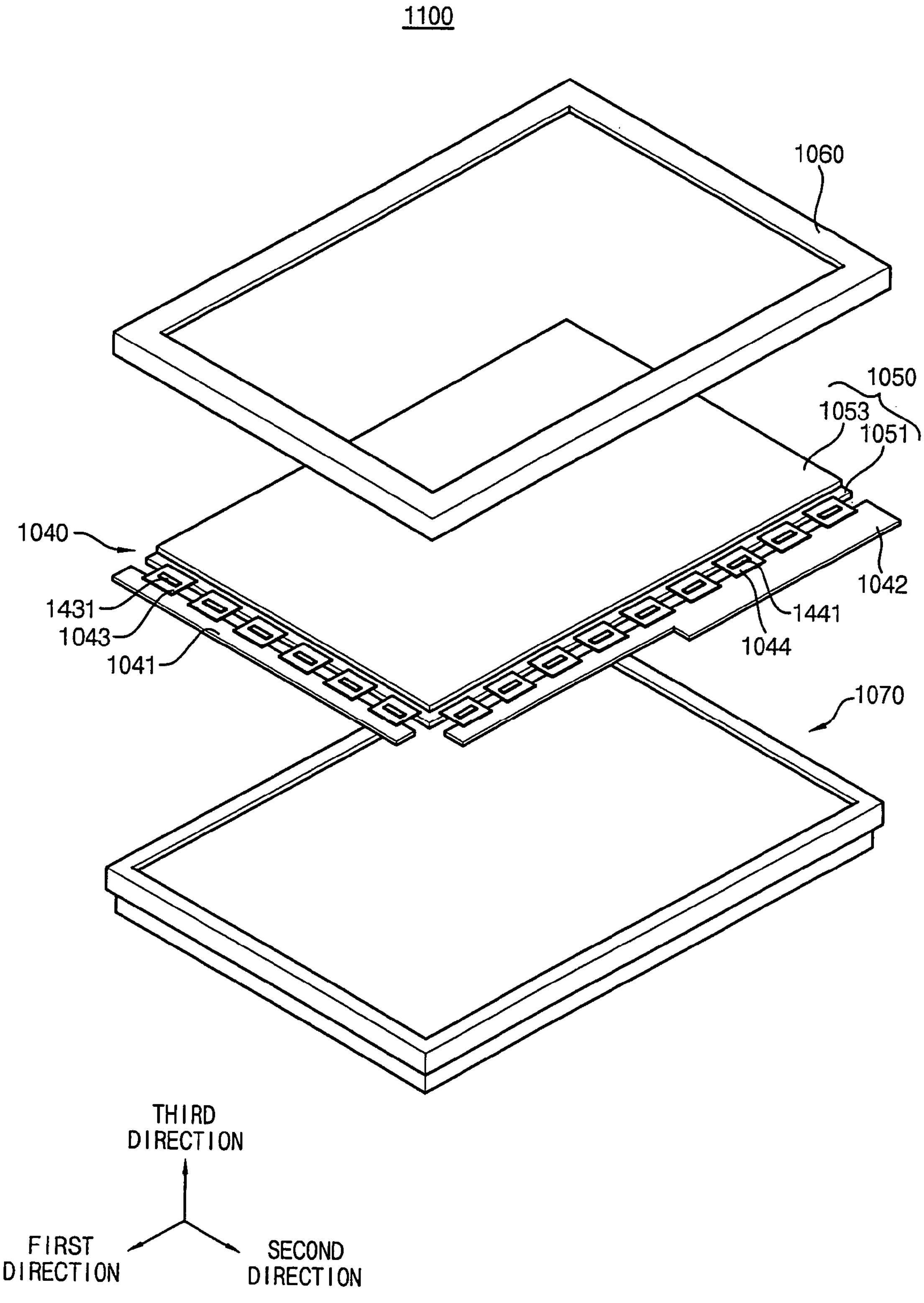
FIG. 21 is an exploded perspective view illustrating an exemplary flat panel display device having an exemplary embodiment of a backlight assembly in accordance with the present invention.

FIG. 21 is an exploded perspective view illustrating an exemplary flat panel display device having an exemplary embodiment of a backlight assembly in accordance with the present invention. The flat panel display device includes an LCD panel as a flat display panel.

As illustrated in FIG. 21, a flat display device 1100 includes an LCD panel 1050 as a flat display panel. However, many variations of the flat display panel are possible. For example, the flat display panel may be a non-emissive type flat display panel.

A top chassis 1060 partially covering the LCD panel 1050 is combined with a backlight assembly 1070 to manufacture the flat panel display device 1100.

An LCD panel assembly 1040 includes the LCD panel 1050, a first driver integrated circuit ("IC") package 1043, a second driver IC package 1044, a first printed circuit board ("PCB") 1041 and a second PCB 1042. The first and second driver IC packages 1043 and 1044 are connected to the LCD panel 1050 to provide the LCD panel 1050 with drive signals. The first and second driver IC packages 1043 and 1044 may be a chip on film ("COF") or a tape carrier package ("TCP"). The first and second PCBs 1041 and 1042 may be received on an inner side face of the top chassis 1060.

The LCD panel 1050 includes a thin film transistor ("TFT") substrate 1051, a color filter substrate 1053, and an LC layer (not shown). The TFT substrate 1051 has a plurality of TFTs. The color filter substrate 1053 is positioned over the TFT substrate 1051. The LC layer is positioned between the TFT substrate 1051 and the color filter substrate 1053.

Polarizing plates (not shown) may be positioned on the color filter substrate 1053 and beneath the TFT substrate 1051 to disperse a light passing through the liquid crystal display panel 1050. The polarizing plates adjust a transmission direction of light externally provided into the TFT substrate 1051 and the color filter substrate 1053 in accordance with an aligned direction of the LC layer. The polarizing plates have first and second polarized axes thereof substantially perpendicular to each other, respectively.

The TFT substrate 1051 is a transparent glass substrate having the TFTs that are arranged in a matrix shape. The TFT substrate 1051 includes a plurality of gate lines and a plurality of data lines crossing over the TFT substrate 1051, where the data lines extend in a direction perpendicular to the gate lines. Source terminals of the TFTs are connected to a data line. Gate terminals of the TFTs are connected to a gate line. A pixel electrode is formed on the drain terminal of the TFTs. The pixel electrode may include a transparent conductive material. The transparent conductive material may be, but is not limited to, indium tin oxide ("ITO").

When the first and second PCBs 1041 and 1042 provide the gate line and the data line with electrical signals, the electrical signals may be supplied to the gate terminal and the source terminal. The electrical signals supplied to the gate terminal and the source terminal may be used for turning on or turning off the TFTs so that an electrical signal used for controlling a voltage applied to the LC layer is supplied to the drain terminal.

The color filter substrate 1053 is positioned over the TFT substrate 1051. The color filter substrate 1053 has at least one color pixel member including a red pixel portion, a green pixel portion and a blue pixel portion. When a light passes through the color pixel member, a color of the light may vary. The color pixel member may be formed in the color filter substrate 1053 by a thin film process. A front face of the color filter substrate 1053 is covered with a common electrode including a transparent conductive material such as, but not limited to, ITO. When the TFT is turned on, an electrical field is generated between the pixel electrodes and the common electrode. The electrical field may vary an alignment of LC molecules included in the LC layer so that a light transparency of the LC layer may vary. Thus, the LCD panel 1050 may display a desired image by using a variation of the light transmissivity.

The first and second PCBs 1041 and 1042 are connected to the first and second driver IC packages 1043 and 1044, respectively. The first and second PCBs 1041 and 1042 may receive external image signals and then provide the gate line and the data line with drive signals. In order to operate the flat panel display device 1100, the first and second PCBs 1041 and 1042 generate a gate and data drive signals, respectively. In addition, the first and second printed circuit boards 1041 and 1042 generate a plurality of timing signals enabling the gate drive signal and the data drive signal to be applied to the gate line and the data line at a desired timing. The gate drive signal and the data drive signal may be applied to the gate line and the data line through the first driver IC package 1043 and the second driver IC package 1044, respectively. The first driver IC package 1043 and the second driver IC package 1044 include a first integrated chip 1431 and a second integrated chip 1441, respectively. A control board (not shown) is positioned beneath the backlight assembly 1070. The control board is connected to the second PCB 1042 to invert an analog data signal into a digital data signal. The control board then provides the LCD panel 1050 with the digital data signal.

The top chassis 1060 is positioned on the LCD panel assembly 1040. The top chassis 1060 may fold the first IC package 1043 and the second IC package 1044 toward a side face of the backlight assembly 1070. In addition, the top chassis 1060 may prevent the LCD panel assembly 1040 from being easily separated from the backlight assembly 1070.

Although it is not particularly illustrated in FIG. 21, a front face case and a rear face case are positioned on the top chassis 1060 and beneath the bottom chassis 1075 (FIG. 13), respectively. The front face case and the rear face case may be combined to each other to manufacture the flat panel display device 1100.

According to the above, the backlight assembly 1070 having the uneven dispersion plate provides the LCD panel 1050 with light having a relatively high brightness and a relatively high brightness uniformity. Thus, the flat panel display device 1100 may efficiently display an image.

Figure 22:
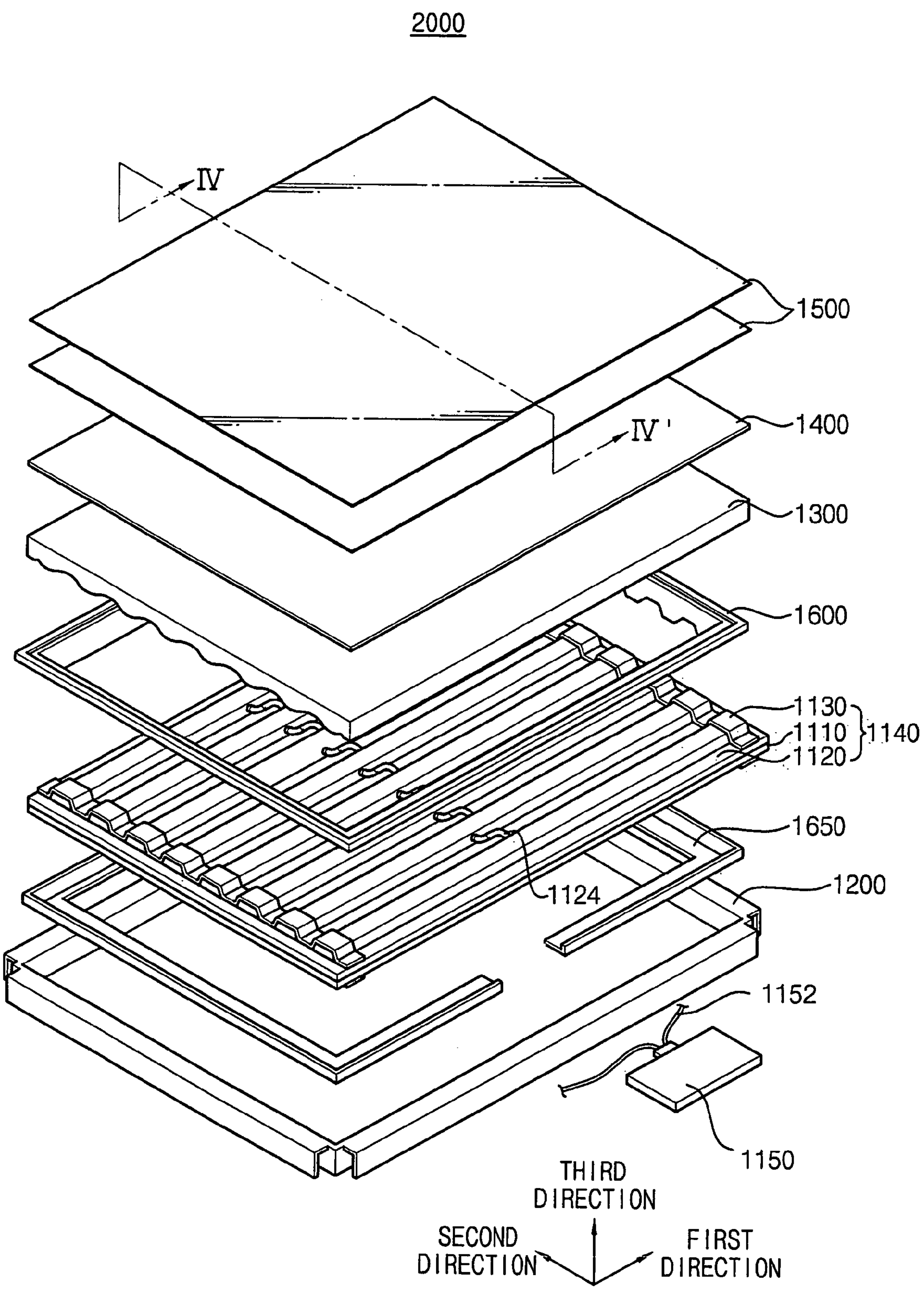
FIG. 22 is a perspective view illustrating an exemplary embodiment of a backlight assembly in accordance with the present invention.
Figure 23:
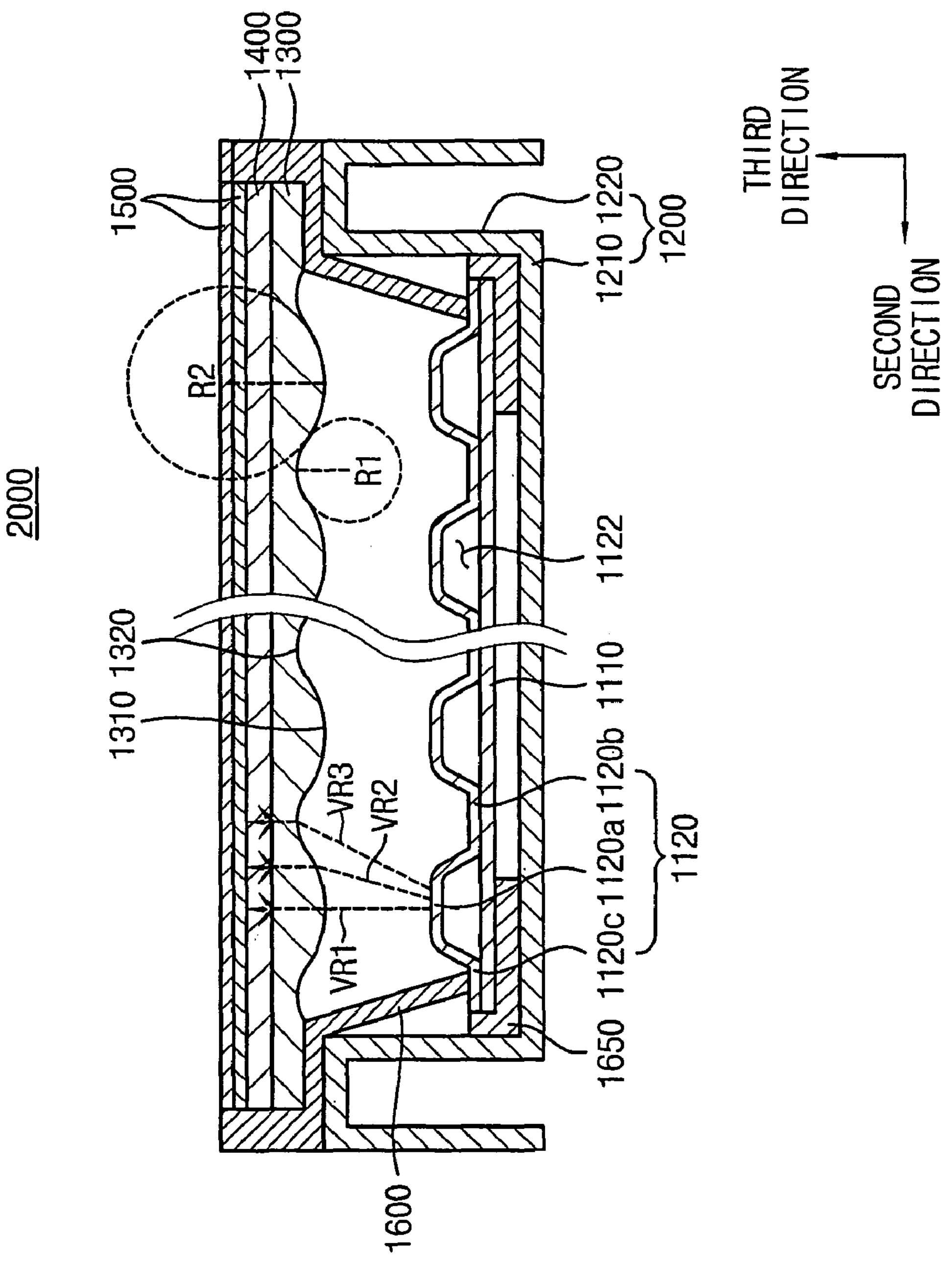
FIG. 23 is a cross-sectional view taken along line IV-IV' in FIG. 22.

FIG. 22 is a perspective view illustrating an exemplary embodiment of a backlight assembly in accordance with the present invention. FIG. 23 is a cross-sectional view taken along line IV-IV' in FIG. 22.

Referring to FIGS. 22 and 23, a backlight assembly 2000 includes a light source 1140, an inverter 1150, a receiving container 1200, a first optical member 1300, a second optical member 1400, an optical sheet member 1500, a first fixing member 1600, and a second fixing member 1650.

The light source 1140 may be a surface light source generating a planar light. The light source 1140 includes a body and an external electrode 1130. The body has a plurality of discharge spaces 1122. The external electrode 1130 may cover end portions of the body. The body includes a first substrate 1110 and a second substrate 1120. The first substrate 1110 and the second substrate 1120 are combined with each other to define the discharge spaces therebetween. The discharge spaces 1122 may have a width of about 14.15 mm. The width may be measured in a second direction. In addition, the discharge spaces 1122 are connected to each other through connection pipes 1124 included in the second substrate 1120.

The first substrate 1110 has a quadrilateral plate shape having a predetermined thickness. The first substrate 1110 may include, but is not limited to, a glass. The first substrate 1110 may include a material capable of blocking ultraviolet rays generated from the discharge space 1122. Thus, the ultraviolet rays may be blocked by the first substrate 1110.

The second substrate 1120 may include a transparent material so that a visible ray generated from the discharge spaces 1122 may pass through the second substrate 1120. For example, the second substrate 1120 may include, but is note limited to, a glass. The second substrate 1120 may include a material capable of blocking the ultraviolet rays generated from the discharge space 1122. Thus, the ultraviolet rays may be blocked by the second substrate 1120.

The second substrate 1120 includes discharge space portions 1120*a*, space separating portions 1120*b*, and sealing portions 1120*c*. The discharge space portion 1120*a* is apart from the first substrate 1110 to define the discharge space 1122 between the discharge space portion 1120*a* and the first substrate 1110. The space separating portion 1120*b* is positioned between the discharge space portions 1120*a* that are adjacent to each other. In addition, the space separating portion 1120*b* may contact the first substrate 1110. The sealing portion 1120*c* is positioned at an edge of the second substrate 1120. The sealing portion 1120*c* makes firm contact with the first substrate 1110 to seal the discharge spaces 1122.

As illustrated in FIG. 23, the discharge space portions 1120*a* are arranged in a second direction. The space separating portion 1120*b* is connected between the discharge space portions 1120*a* that are adjacent to each other.

In addition, as illustrated in FIG. 23, a longitudinal section of the discharge space portion 1120*a* has an arch shape. However, many apparent variations of the longitudinal sections are possible. For example, the longitudinal section of the discharge space portion 1120 may have a semicircle shape, a quadrilateral shape, a trapezoid shape, etc.

A molding process such as an injection molding process and an extrusion molding process is performed to form the second substrate 1120.

The connection pipe 1124 is simultaneously formed with the second substrate 1120. That is, the connection pipe 1124 is integrally formed with the second substrate 1120. An air is exhausted from or introduced into the discharge spaces 1122 through the connection pipe 1124. In addition, a discharge gas is also exhausted from or introduced into the discharge spaces 1122 through the connection pipe 1124. Gas between adjacent spaces 1122 may flow through the connection pipes 1124 positioned between adjacent spaces 1122.

The body includes a reflection layer (not shown), a first fluorescent layer (not shown) and a second fluorescent layer (not shown). The reflection layer is formed on an upper face of the first substrate 1110, the upper face of the first substrate 1110 facing a lower face of the second substrate 1120. The first fluorescent layer is formed on the reflection layer. The second fluorescent layer is formed beneath a lower face of the second substrate 1120, the lower face of the second substrate facing the reflection layer. Thus, the second fluorescent layer faces the first fluorescent layer.

The reflection layer reflects visible rays generated from the first and second fluorescent layers toward the first optical member 1300 so that the visible rays do not substantially leak through the first substrate 1110.

The first and second fluorescent layers may generate the visible rays by using the ultraviolet rays incident thereon. The ultraviolet rays may be generated by plasma discharges in the discharge spaces 1122.

The external electrodes 1130 extend on the second substrate 1120 and beneath the first substrate 1110 in a second direction. The external electrode 1130 corresponds to end portions of the discharge spaces 1122 so that the external electrode 1130 may be partially overlapped with the discharge spaces 1122. The external electrode 1130 may include a conductive material so that a discharge voltage supplied from the inverter 1150 to the external electrode 1130 may be efficiently transferred to the discharge spaces 1122 that are partially overlapped by the external electrode 1130.

The inverter 1150 may generate the discharge voltage for generating the plasma discharges. When a relatively low alternating current voltage is applied to the inverter 1150, the inverter may invert the relatively low alternating current voltage into a relatively high alternating current that is used as the discharge voltage. The inverter 1150 may be positioned beneath the receiving container 1200. The discharge voltage generated from the inverter 1150 may be applied to the external electrode 1130 of the light source 1140 through an electric wire 1152.

The receiving container 1200 may include a bottom portion 1210 and a side portion 1220. The side portion 1220 extends from an edge of the bottom portion 1210. The bottom portion 1210 and the side portion 1220 together may define a receiving recess in which the light source 1140 is received. The side portion 1220 of the receiving container 1200 may have an inverted U-shape. The receiving container 1200 may include a metal having a substantially large strength.

The first optical member 1300 is positioned over the light source 1140. More particularly, in one exemplary embodiment, the first optical member 1300 is spaced apart from the light source 1140 by an interval of about 13 mm in a third direction, where the third direction is substantially perpendicular to a planar light emitting surface of the backlight assembly 2000. A light generated from the light source 1140 is incident on the first optical member 1300. The first optical member 1300 may disperse the light so that brightness uniformity may be improved. The first optical member 1300 may include a transparent material having a relatively high light transparency. Thus, the transparency of the first optical member 1300 may be no less than about 90%.

In accordance with positions of the discharge spaces 1122 of the light sources 1140, an amount of the light incident on the first optical member 1300 may vary.

Thus, a first portion of the optical member 1300, the first portion being positioned over the space separating portion 1120, may be substantially thinner than a second portion of the optical member 1300, the second portion being positioned over the discharge space 1122 of the light source 1140.

A lower face portion of the first optical member 1300 includes a plurality of ridges 1310 and a plurality of grooves 1320 so that a lower face of the first optical member 1300 may have a wave shape. The first optical member 1300 including the lower face having the wave shape may be formed by a molding process such as an extrusion molding process and an injection molding process. In detail, the ridge 1310 of the first optical member 1300 corresponds to the discharge space 1122 of the light source 1100. That is, each ridge 1310 of the first optical member 1300 is positioned directly over each discharge space portion 1120*a* having the arch shape, respectively.

In one exemplary embodiment, a first thickness of the first portion of the first optical member 1300, measured where the first portion where the groove 1320 is formed is at its thinnest point within the first optical member 1300, is about 2.0 mm. A second thickness of the second portion of the first optical member 1300, measured where the second portion is at its thickest point within the first optical member 1300 where the ridge 1310 is formed, is about 2.9 mm.

A first radius of curvature R1 of the first portion of the first optical member 1300, the first portion where the groove 1320 is formed, is about 14.12 mm. A second radius of curvature R2 of the second portion of the first optical member 1300, the second portion where the ridge 1310 is formed, is also about 14.12 mm.

Because the lower face of the first optical member 1300 has the wave shape, the light irregularly incident on the lower face of the first optical member 1300 may be uniformly irradiated from an upper face of the first optical member 1300. Thus, the brightness uniformity may be improved. In addition, the wave shape of the first optical member 1300 may prevent the first optical member 1300 from being easily bent under conditions concerning an external force, humidity and/or temperature.

The plasma discharge is generated in the discharge space 1122 of the light source 1140. The plasma discharge may generate the ultraviolet rays enabling the first and second fluorescent layers to generate the visible rays. The visible rays include a first visible ray VR1, a second visible ray VR2, and a third visible ray VR3. It should be understood that the visible rays VR1, VR2, and VR3 are exemplary only, and that only a few of the visible rays, out of the large number of visible rays generated from the light source 1140, are illustrated for clarity.

The first visible ray VR1 is irradiated from the discharge space 1122 in a third direction so that the first visible ray VR1 is directly incident on the ridge 1310 of the first optical member 1300 in the third direction. The first visible ray VR1 may pass through the second portion of the optical member 1300, the second portion where the ridge 1310 is formed, in the third direction without refraction.

When the first visible ray VR1 passes through the second portion of the optical member 1300, a decrease rate of an intensity of the first light may be relatively large because the second portion of the optical member 1300 is relatively thick.

The second visible ray VR2 is irradiated from the discharge space 1122 in a direction horizontally inclined by a first angle with respect to the bottom portion 1210 *f* the receiving container 1200. The second visible ray VR2 may be incident on a middle portion of the first optical member, the middle portion positioned between the first portion and the second portion. When the second visible ray VR2 passes through the first optical member, the second visible ray VR2 may be refracted. In addition, when the second visible ray VR2 passes through the middle portion of the optical member 1300, a decrease rate of an intensity of the second light may be substantially smaller than that of the first light because the middle portion is substantially thinner than the second portion.

The third visible ray VR3 is irradiated from the discharge space 1122 in a direction horizontally inclined by a second angle with respect to the bottom portion 1210. Here, the second angle is substantially larger than the first angle. The third visible ray VR3 may be incident on the first portion of the first optical member 1300, the first portion where the groove 1320 is formed. When the third visible ray VR3 passes through the first optical member 1300, the third visible ray VR3 may be refracted. In addition, when the third visible ray VR3 passes through the first portion of the first optical member 1300, a decrease rate of an intensity of the third light may be substantially smaller than that of the second light and the first light because the first portion is substantially thinner than the middle portion and the second portion.

As described above, the visible rays generated from the light source 1140 may be refracted in the first optical member 1300. In addition, when the visible rays pass through the first optical member 1300, intensities of the visible rays may vary. Thus, the brightness uniformity may be improved.

As illustrated in FIG. 23, the lower face of the first optical member 1300 has the wave shape because a longitudinal section of the ridge 1310 has a semicircular cylindrical shape. However, many apparent variations of shapes of the longitudinal section are possible and within the scope of these embodiments. For example, the longitudinal section of the ridge 1310 may have a triangle shape, an arch shape, a trapezoid shape, etc.

The second optical member 1400 is positioned on the first optical member 1300. The second optical member 1400 may disperse a light irradiated from the first optical member 1300 so that the brightness uniformity may be improved. The second optical member 1400 may have a plate shape having a predetermined thickness. The second optical member 1400 may include a transparent material. A transparency of the second optical member 1400 may be from about 70% to about 80%. The second optical member 1400 may include PMMA. In addition, the second optical member 1400 may include a dispersion member (not shown) dispersing the light.

The third optical member 1500 may be positioned on the second optical member 1400. The light irradiated from the second optical member 1400 may be incident on the third optical member 1500. The third optical member 1500 may vary a path of the light passing therethrough so that the brightness may be improved. The third optical member 1500 may include a concentration sheet enabling the light incident on the third optical member 1500 to be irradiated from the third optical members 1500 in a third direction. Thus, the brightness of the light may be improved. In addition, the third optical member 1500 may include a dispersion sheet dispersing the light incident thereon. While the third optical member 1500 is described as containing a particular number of optical sheets, it should be understood that a variety of optical sheets and number of optical sheets would be within the scope of these embodiments.

The first fixing member 1600 is positioned between the light source 1140 and the first optical member 1300. The first fixing member 1600 fixes the light source 1140. In addition, the first fixing member 1600 may support the first optical member 1300, the second optical member 1400, and the third optical member 1500 upon a planar supporting portion of the first fixing member 1600. The first fixing member 1600 may be positioned on the light source 1140. In addition, the first fixing member 1600 may be combined with side portions of the receiving container 1200. The first fixing member 1600 may partially cover upper edge portions of the light source 1140. As illustrated in FIG. 22, the first fixing member 1600 has a frame shape that is formed as one body. However, many apparent variations of shapes of the first fixing member 1600 are possible. For example, the first fixing member 1600 may be separated into two parts, four parts, etc.

The second fixing member 1650 is positioned between the light source 1140 and an upper surface of the bottom portion 1210 of the receiving container 1200 so that the second fixing member 1650 may support the light source 1140 over the bottom portion 1210. The second fixing member 1650 partially covers an edge of the light source 1140. The second fixing member 1650 is positioned between the light source 1140 and the bottom portion 1210 of the receiving container 1200 so that the light source 1140 and the receiving container 1200 may be electrically insulated from each other. The second fixing member 1650 may include an insulation material.

In addition, the second fixing member 1650 has elasticity so that the second fixing member 1650 may absorb external impact. The second fixing member 1650 may include a first fixing portion and a second fixing portion as shown in FIG. 22. The first fixing portion and the second fixing portion are spaced apart from each other. Each of the first fixing portion and the second fixing portion may include an L-shape, a U-shape, etc.

Many apparent variations of shapes of the second fixing member 1650 are possible. For example, the second fixing member 1650 may be separated into four parts covering sidewalls of the light source 1140. As another example, the second fixing member 1650 may be separated into four parts covering corners of the light source 1140. As still another example, the second fixing member 1650 may be formed as one body.

Figure 24A:
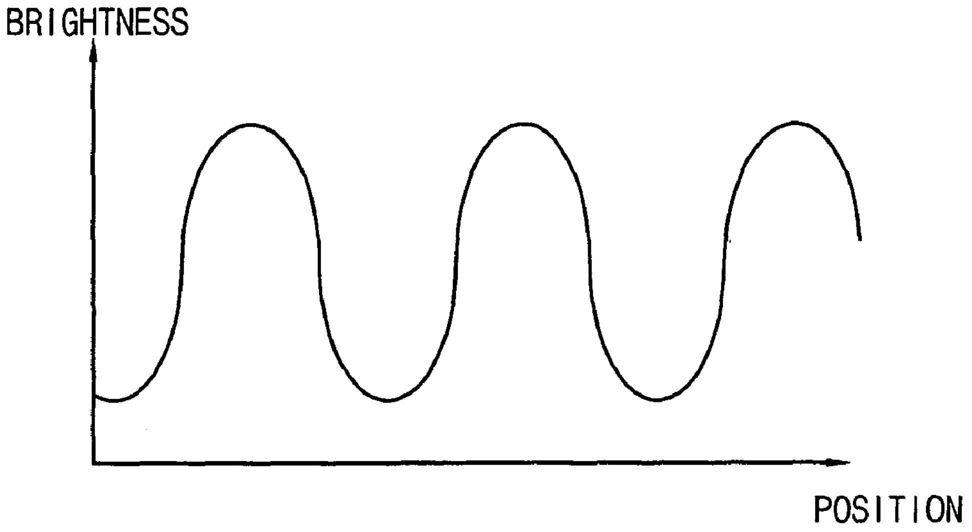
FIGS. 24A to 24C are graphs illustrating variations of brightnesses in relation to position.
Figure 24B:
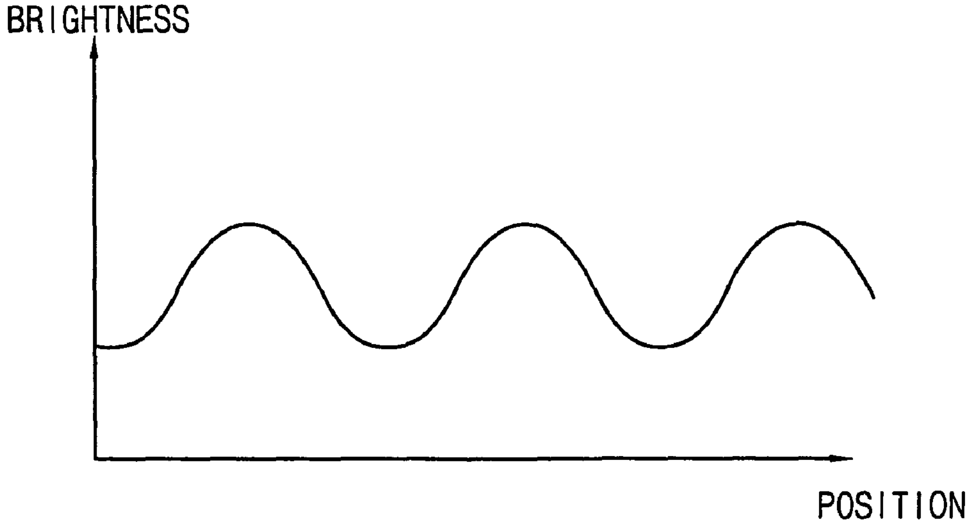
Figure 24C:
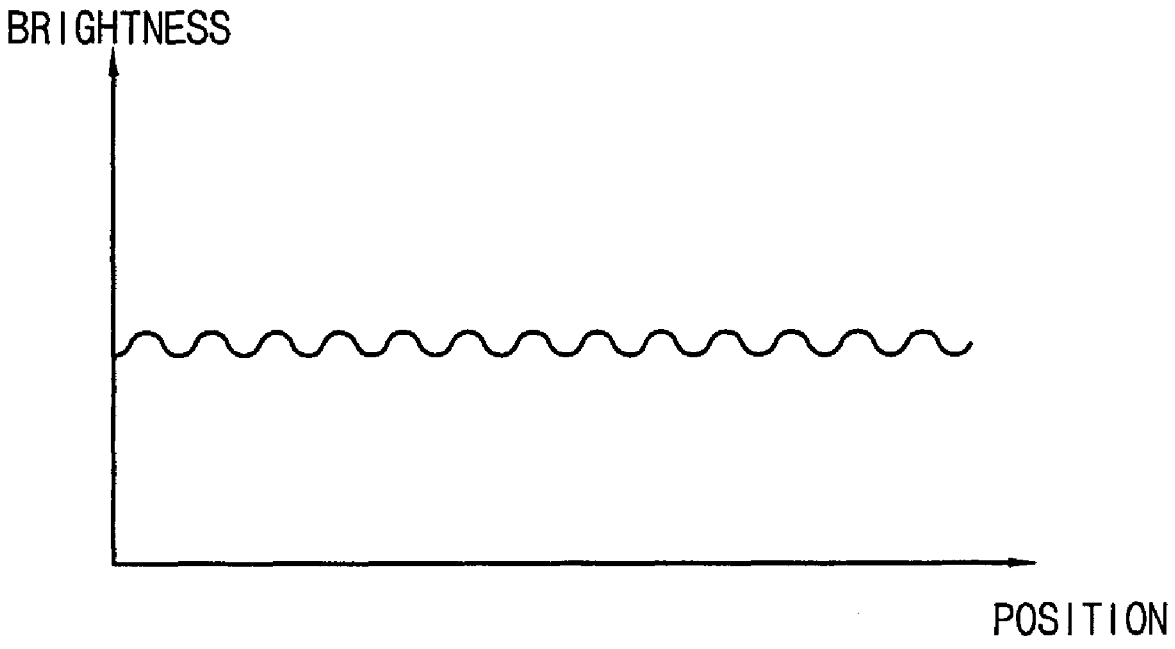

FIGS. 24A to 24C are graphs illustrating variations of brightnesses. In particular, a graph in FIG. 24A illustrates a variation of brightness of the light irradiated from the exemplary light source in FIG. 23. A graph in FIG. 24B illustrates a variation of brightness of the light irradiated from the exemplary first optical member in FIG. 23. A graph in FIG. 24C illustrates a variation of brightness of the light irradiated from the exemplary second optical member in FIG. 23.

Referring to FIGS. 23 and 24A, a brightness distribution of a light irradiated from the light source 1140 may vary with substantially large amplitude in accordance with a position along a second direction of the light source 1140.

In particular, the brightness distribution of the light irradiated from the light source 1140 may vary with the substantially large first amplitude in accordance with the positions of the discharge spaces 1122 of the light source 1140. That is, brightness of a light irradiated from the discharge space 1122 may be relatively high. In addition, brightnesses of the light irradiated between the discharge spaces 1122 that are adjacent to each other, such as in positions corresponding to the space separating portions 1120*b*, may be relatively low.

Referring to FIGS. 23 and 24B, a brightness distribution of a light irradiated from the first optical member 1300 may vary with second amplitude substantially smaller than the first amplitude in accordance with the positions of the discharge spaces 112 of the light source 1140.

In particular, the light irradiated from the light source 1140 may be incident on the first optical member 1300. The light then passes through the first optical member 1300. The brightness distribution of the light irradiated from the first optical member 1300 may vary with the second amplitude substantially smaller than the first amplitude in accordance with the positions of the discharge spaces 112 of the light source 1140. Thus, the brightness is more uniform as compared to the light prior to passing through the first optical member 1300, as shown in FIG. 24A.

Referring to FIGS. 23 and 24C, a brightness distribution of a light irradiated from the second optical member 1400 may vary with third amplitude substantially smaller than the second amplitude.

In particular, the light irradiated from the light source 1140 may be incident on the first optical member 1300. The light then passes through the first optical member 1300. Subsequently, the light irradiated from the first optical member 1300 may be incident on the second optical member 1400. The light then passes through the second optical member 1400. The brightness distribution of the light irradiated from the second optical member 1400 may vary with a third amplitude substantially smaller than the second amplitude. As illustrated in FIG. 24C, the third amplitude is exceedingly small. In addition, the brightness distribution of the light irradiated from the second optical member 1400 may be substantially irrelevant to the positions of the discharge spaces 112 of the light source 1140.

According to the present invention, the first optical member 1300 has an irregular thickness so that the brightness of the light may be improved.

As illustrated in FIG. 23, the backlight assembly includes a face light source having the discharge spaces 1122. Alternatively, the backlight assembly may have a cold cathode fluorescent lamp ("CCFL") having a bar shape, an external electrode fluorescent lamp ("EEFL"), a light emitting diode ("LED"), etc., instead of the face light source 1140.

Figure 25:
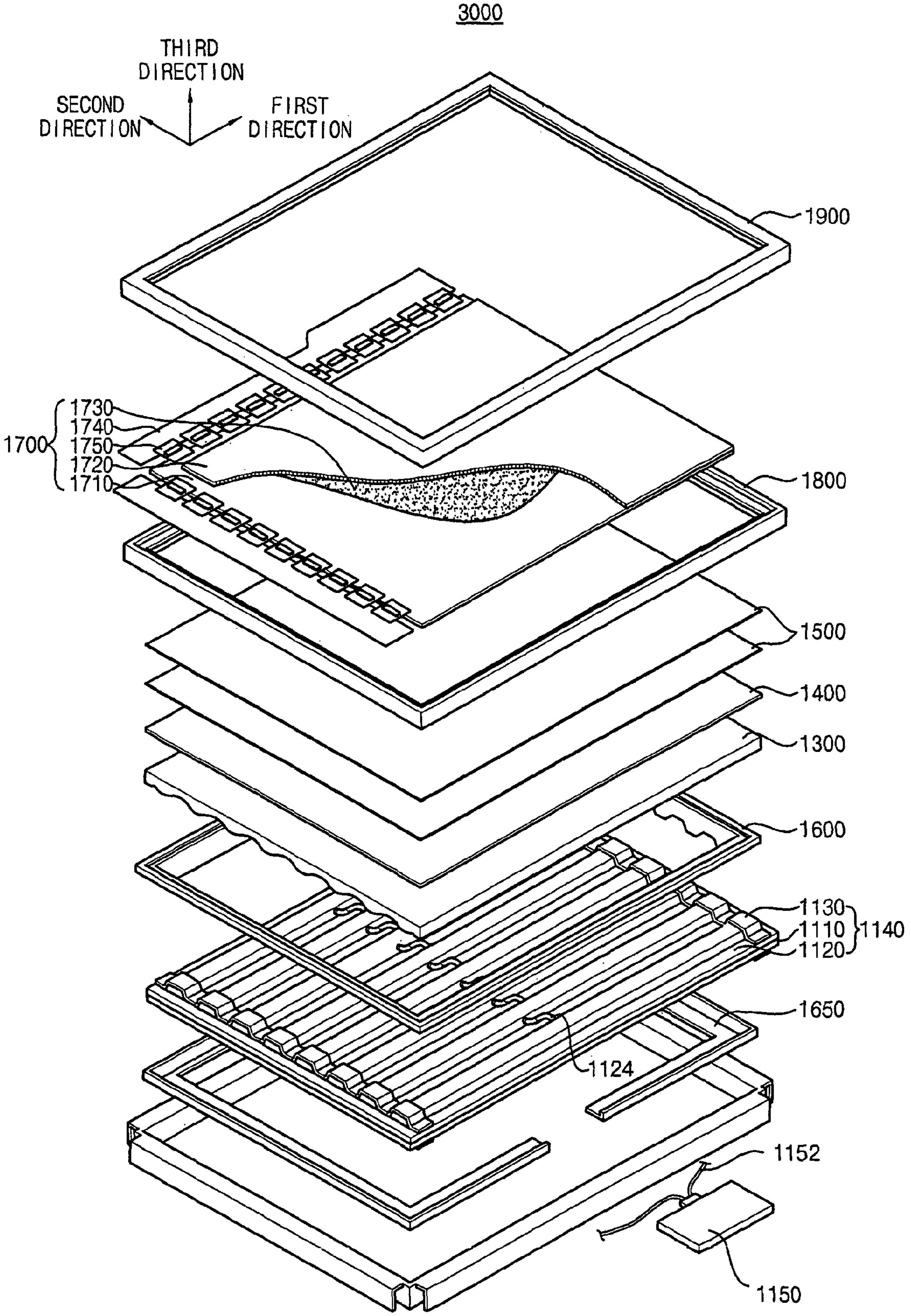
FIG. 25 is a perspective view illustrating an exemplary embodiment of a display device in accordance with the present invention.

FIG. 25 is a perspective view illustrating an exemplary embodiment of a display device in accordance with the present invention.

A backlight assembly included in the display device is substantially identical to that illustrated in FIG. 23. Thus, the same reference numerals will be used to refer to the same or like parts as those already illustrated in FIG. 23 and any repetitive explanation thereof will be omitted.

Referring to FIG. 25, a display device 3000 includes a backlight assembly 2000, a display panel 1700, a third fixing member 1800, and a fourth fixing member 1900.

The display panel 1700 is positioned on the backlight assembly 2000. The display panel 1700 may display an image by using a light irradiated from the backlight assembly 2000. The display panel 1700 includes a TFT substrate 1710, a color filter substrate 1720, an LC layer 1730, a PCB 1740 and a flexible PCB 1750.

The TFT substrate 1710 includes pixel electrodes, TFTs, and signal lines. The pixel electrodes are arranged in a matrix shape. The TFTs provide the pixel electrodes with a drive voltage. The signal lines are used for operating the TFTs.

The pixel electrodes include a transparent conductive material such as, but not limited to, ITO, IZO, a-ITO, etc. The pixel electrodes may be formed by a patterning process such as, but not limited to, a photolithography process.

The color filter substrate 1720 is opposite the TFT substrate 1710. The color filter substrate 1720 includes a common electrode and color filters. The common electrode is positioned on a front face of the color filter substrate 1720. The color filters are opposite to the pixel electrodes.

The color filters include a red color filter, a green color filter, and a blue color filter. When a white light is incident on the red color filter, a red light may be irradiated from the red color filter. When the white light is incident on the green color filter, a green light may be irradiated from the green color filter. When the white light is incident on the blue color filter, a blue light is irradiated from the blue color filter.

The LC layer 1730 is positioned between the TFT substrate 1710 and the color filter substrate 1720. When an electrical filed is applied between the pixel electrode and the common electrode, LC molecules included in the LC layer 1730 may be rearranged. Thus, a light transmissivity of the LC layer varies so that the display device 3000 may display an image.

The PCB 1740 includes a drive circuit unit inverting an external image signal into a drive signal for controlling the TFT. The PCB 1740 includes a data PCB and a gate PCB. The flexible PCB 1750 connected to the data PCB is bent so that the data PCB is positioned on a side face or a rear face of the receiving container 1200. In addition, the flexible PCB 1750 connected to the gate PCB is bent so that the gate PCB may be positioned on the side face or the rear of the receiving container 1200. A signal wire may be formed in the TFT substrate 1710 and the flexible PCB 1750 instead of the gate PCB.

The flexible PCB 1750 may electrically connect the PCB 1740 to the TFT substrate 1710 so that the drive signal generated from the PCB 1740 may be supplied to the TFT substrate 1710. The flexible PCB 1750 may be a tape carrier package ("TCP") or a chip on film ("COF").

The third fixing member 1800 is positioned between the third optical member 1500 and the display panel 1700. The third fixing member 1800 may fix the first optical member 1300, the second optical member 1400, and the third optical member 1500. In addition, the third fixing member 1800 may support the display panel 1700 thereon. As illustrated in FIG. 25, the third fixing member 1800 is formed as one body. However, many apparent variations of shapes of the third fixing member 1800 are possible. By example only, the third fixing member 1800 may include two, four, or any other number of parts that are separated from each other.

The fourth fixing member 1900 encloses an edge of the display panel 1700. The fourth fixing member 1900 is combined with a side portion of the receiving container 1200 so that the display panel 1700 may be fixed to an upper portion of the backlight assembly 2000.

The fourth fixing member 1900 prevents the display panel 1700 having a relatively low brittleness from being easily damaged by external impacts and external vibrations. In addition, the fourth fixing member 1900 may prevent the display panel 1700 from being easily separated from the receiving container 1200.

According to the present invention, a light dispersion member dispersing a light has an irregular thickness so that brightness and brightness uniformity may be improved. In addition, a display device may display an image having a relatively high display quality.

Furthermore, exemplary embodiments of the backlight assembly according to the present invention need not include a dual brightness improving film that is relatively expensive. As a result, a cost required for manufacturing the backlight assembly may be lower than the cost required for manufacturing a backlight assembly having a dual brightness improving film.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A backlight assembly comprising:

light sources generating a light, the light sources extending in a first direction;

a dispersion plate dispersing the light incident thereon, the dispersion plate including a lower face including a ridge portion disposed on an entire portion of the lower face of the dispersion plate, the ridge portion including ridges extending substantially in the first direction; and a fixing member supporting the dispersion plate thereon, wherein a central portion of each of the ridges is disposed over and faces the light sources and an edge portion of the lower face is supported on the fixing member, and the ridge portion and the fixing member include complimentary wave shapes.

2. The backlight assembly of claim 1, further comprising a light source holder fixing end portions of at least one of the light sources, wherein the fixing member covers the light source holder.

3. The backlight assembly of claim 2, wherein the light sources are lamps.

4. A backlight assembly comprising:

a light source generating a first light having a first brightness and a second light having a second brightness, a level of the second brightness substantially higher than a level of the first brightness; and a first optical member positioned over the light source, the first optical member having a first portion having a first vertical thickness and a second portion having a second vertical thickness, the second thickness substantially larger than the first thickness, the first portion positioned where the first light is incident, the second portion positioned where the second light is incident.

5. The backlight assembly of claim 4, wherein the first portion has a groove, and the second portion has a ridge.

6. The backlight assembly of claim 5, wherein the first optical member is formed by an extrusion molding process.

7. The backlight assembly of claim 5, wherein the first optical member is formed by an injection molding process.

8. The backlight assembly of claim 5, wherein a lower face portion of the first optical member has a wave shape.

9. The backlight assembly of claim 5, wherein the groove and the ridge are positioned at a lower face portion of the first optical member, the groove and the ridge facing the light source.

10. The backlight assembly of claim 5, wherein the light source includes a plurality of discharge space portions defining a plurality of discharge spaces.

11. The backlight assembly of claim 10, wherein the ridge of the first optical member corresponds to the discharge space portion.

12. The backlight assembly of claim 10, wherein each of the discharge space portions has an arch shape.

13. The backlight assembly of claim 4, further comprising a second optical member, the second optical member positioned on the first optical member, the second optical member dispersing a light irradiated from the first optical member.

14. A display device comprising:

a backlight assembly including a light source and a first optical member, the light source generating a first light having a first brightness and a second light having a second brightness, a level of the second brightness substantially higher than a level of the first brightness, the first optical member positioned over the light source, the first optical member having a first portion having a first vertical thickness and a second portion having a second vertical thickness, the second thickness substantially larger than the first thickness, the first portion positioned where the first light is incident, and the second portion positioned where the second light is incident; and a display panel positioned over the backlight assembly, the display panel displaying an image by using a light irradiated from the backlight assembly.

* * * * *